US011503520B2

(12) United States Patent
Xu et al.

(10) Patent No.: US 11,503,520 B2
(45) Date of Patent: *Nov. 15, 2022

(54) USER EQUIPMENT HANDOVER METHOD AND DEVICE

(71) Applicant: Huawei Technologies Co., Ltd., Shenzhen (CN)

(72) Inventors: Xiaoying Xu, Shanghai (CN); Qufang Huang, Shanghai (CN); Xiaoxiao Zheng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 83 days.

This patent is subject to a terminal disclaimer.

(21) Appl. No.: 17/011,691

(22) Filed: Sep. 3, 2020

(65) Prior Publication Data
US 2020/0404550 A1 Dec. 24, 2020

Related U.S. Application Data

(63) Continuation of application No. 15/822,776, filed on Nov. 27, 2017, now Pat. No. 10,791,484, which is a (Continued)

(51) Int. Cl.
*H04W 36/00* (2009.01)
*H04W 36/08* (2009.01)
(Continued)

(52) U.S. Cl.
CPC .............. *H04W 36/08* (2013.01); *H04L 65/40* (2013.01); *H04W 36/0005* (2013.01);
(Continued)

(58) Field of Classification Search
CPC .............. H04L 29/08; H04W 36/0005; H04W 36/0011; H04W 36/0016; H04W 36/0072;
(Continued)

(56) References Cited

U.S. PATENT DOCUMENTS 8,578,035 B2  11/2013  Miklós et al.
8,676,205 B2  3/2014  Kwun et al.
(Continued)

FOREIGN PATENT DOCUMENTS

CN  1933652 A  3/2007
CN  101047622 A  10/2007
(Continued)

OTHER PUBLICATIONS

Kim, 3GPP LTE(-A): Part II LTE System MAC/Network Layer, Winner, 139 pages, Aug. 29, 2014.*
(Continued)

*Primary Examiner* — Frank Duong
(74) *Attorney, Agent, or Firm* — Slater Matsil, LLP

(57) ABSTRACT

Embodiments provide a user equipment handover method, and a device. In embodiments of the present invention, when a handover is to be performed, user equipment may send first information that is used to request a handover, and then a destination network device may allocate a first uplink resource to the user equipment.

23 Claims, 10 Drawing Sheets

Related U.S. Application Data continuation of application No. PCT/CN2015/079986, filed on May 27, 2015.

(51) Int. Cl.
   *H04L 65/40* (2022.01)
   *H04W 36/38* (2009.01)
   *H04W 56/00* (2009.01)
   *H04W 72/04* (2009.01)
   *H04W 36/02* (2009.01)

(52) U.S. Cl.
   CPC ....... *H04W 36/0072* (2013.01); *H04W 36/38* (2013.01); *H04W 56/001* (2013.01); *H04W 72/0406* (2013.01); *H04W 36/02* (2013.01)

(58) Field of Classification Search
   CPC ... H04W 36/02; H04W 36/08; H04W 36/125; H04W 36/14; H04W 36/18; H04W 36/24; H04W 36/30; H04W 36/34; H04W 36/38; H04W 56/001; H04W 72/04; H04W 72/0406; H04W 80/04
   See application file for complete search history.

(56) References Cited

U.S. PATENT DOCUMENTS

| | | | |
|---|---|---|---|
| 8,804,667 | B2 | 8/2014 | Wang |
| 8,811,350 | B2 * | 8/2014 | Chung ................. H04L 5/0098 370/332 |
| 8,830,851 | B2 | 9/2014 | Min et al. |
| 8,982,841 | B2 | 3/2015 | Srinivasan |
| 9,001,754 | B2 | 4/2015 | Kato et al. |
| 9,462,542 | B2 | 10/2016 | Zhao et al. |
| 10,009,811 | B2 | 6/2018 | Hooli et al. |
| 10,104,585 | B2 | 10/2018 | Park et al. |
| 10,772,021 | B2 * | 9/2020 | Wang ................. H04W 36/30 |
| 2008/0267131 | A1 | 10/2008 | Kangude et al. |
| 2010/0003981 | A1 | 1/2010 | Ahluwalia |
| 2011/0058529 | A1 | 3/2011 | Uemura |
| 2011/0081932 | A1 | 4/2011 | Astely et al. |
| 2011/0292911 | A1 | 12/2011 | Uemura et al. |
| 2012/0218966 | A1 | 8/2012 | Yamazaki et al. |
| 2014/0092866 | A1 | 4/2014 | Teyeb et al. |
| 2015/0092541 | A1 | 4/2015 | Yang et al. |
| 2015/0105084 | A1 | 4/2015 | Bontu et al. |

FOREIGN PATENT DOCUMENTS

| | | |
|---|---|---|
| CN | 101606419 A | 12/2009 |
| CN | 101715237 A | 5/2010 |
| CN | 101822095 A | 9/2010 |
| CN | 101932052 A | 12/2010 |
| CN | 101998553 A | 3/2011 |
| CN | 102271374 A | 12/2011 |
| CN | 102282890 A | 12/2011 |
| CN | 103945471 A | 7/2014 |
| CN | 104469859 A | 3/2015 |
| CN | 104509160 A | 4/2015 |
| CN | 104521252 A | 4/2015 |
| EP | 2187668 A1 | 5/2010 |
| WO | 2014059663 A1 | 4/2014 |
| WO | 2014198295 A1 | 12/2014 |

OTHER PUBLICATIONS

3rd Generation Partnership Project;Technical Specification Group Radio Access Network; Evolved Universal Terrestrial Radio Access (E-UTRA); Radio Resource Control (RRC); Protocol specification (Release 12), 3GPP TS 36.331 V12.5.0 (Mar. 2015), 445 pages.

Helenius, A., "Performance of Handover in Long Term Evolution," Thesis submitted for examination for the degree at Master of Science in Technology, Espoo Jan. 11, 2011, 75 pages.

Kim, J. et al., "Adaptive Time-to-Trigger Scheme for Optimizing LTE Handover," International Journal of Control and Automation, vol. 7, No. 4 (2014), pp. 35-44.

Alcatel-Lucent, "Selected highlights from RAN#48 relevant to RAN1", 3GPP Draft; R1-104182, Jul. 5, 2010, XP050598533, 2 pages.

* cited by examiner

USER EQUIPMENT HANDOVER METHOD AND DEVICE

CROSS-REFERENCE TO RELATED APPLICATIONS

This application is a continuation of U.S. patent application Ser. No. 15/822,776, filed on Nov. 27, 2017, which is a continuation of International Application No. PCT/CN2015/079986, filed on May 27, 2015. All of the afore-mentioned patent applications are hereby incorporated by reference in their entireties.

TECHNICAL FIELD

The present invention relates to the field of communications technologies, and in particular, to a user equipment handover method, and a device.

BACKGROUND

In the prior art, when user equipment (UE) moves between multiple base stations, the UE may be handed over from one base station to another base station.

In the prior art, a processing procedure during a handover of the UE is usually as follows.

The UE notifies a control node of a target node to which the UE is to be handed over. After receiving the notification, the control node instructs the target node to prepare an access resource for the UE, and instructs the UE to access the target node. Then, the UE begins to initiate a random access procedure to the target node, to obtain an uplink resource. After obtaining the uplink resource, the UE may send uplink data by using the obtained uplink resource.

It can be learned that, in the prior art, during a handover of UE, in addition to a step required for the handover, a random access procedure is additionally required, to contend for an uplink resource. As a result, a relatively large quantity of steps are required, a relatively long time is consumed, and handover efficiency is relatively low.

SUMMARY

Embodiments of the present invention provide a user equipment handover method, and a device, so as to resolve a technical problem of relatively low handover efficiency during a handover of user equipment.

According to a first aspect, a user equipment handover method is provided. The method includes sending, by user equipment, first information to a control network device or a source network device, where the first information is used to request a handover of the user equipment from the source network device to a destination network device. The method also includes receiving, by the user equipment, second information from the destination network device, the source network device, or the control network device, where the second information is used to notify the user equipment of a first uplink resource allocated to the user equipment by the destination network device.

With reference to the first aspect, in a first possible implementation of the first aspect, after the sending, by user equipment, first information to a control network device or a source network device, the method further includes: receiving, by the user equipment, a synchronization signal temporarily added and sent by the destination network device, where the synchronization signal is used by the user equipment to complete downlink synchronization with the destination network device.

With reference to the first possible implementation of the first aspect, in a second possible implementation of the first aspect, before the receiving, by the user equipment, a synchronization signal temporarily added and sent by the destination network device, the method further includes: receiving, by the user equipment, a symbol location of the synchronization signal from the control network device, the destination network device, or the source network device; and the receiving, by the user equipment, a synchronization signal temporarily added and sent by the destination network device includes: receiving, by the user equipment according to the received symbol location, the synchronization signal temporarily added and sent by the destination network device.

With reference to the first aspect or the first possible implementation or the second possible implementation of the first aspect, in a third possible implementation of the first aspect, after the sending, by user equipment, first information to a control network device or a source network device, the method further includes: receiving, by the user equipment, a device identifier from the destination network device or the control network device, where the device identifier is a unique identifier of the user equipment within a coverage area of the destination network device.

With reference to the first aspect or the first possible implementation or the second possible implementation or the third possible implementation of the first aspect, in a fourth possible implementation of the first aspect, the first uplink resource is a PUSCH resource or a PUCCH resource.

With reference to the fourth possible implementation of the first aspect, in a fifth possible implementation of the first aspect, after the receiving, by the user equipment, second information from the destination network device, the source network device, or the control network device, the method further includes: if the first uplink resource is the PUSCH resource, sending, by the user equipment, a buffer status report or a data packet to the destination network device by using the first uplink resource; or if the first uplink resource is the PUCCH resource, sending, by the user equipment, scheduling request information to the destination network device by using the first uplink resource.

With reference to any one of the first aspect or the first to the fifth possible implementations of the first aspect, in a sixth possible implementation of the first aspect, after the receiving, by the user equipment, second information from the destination network device, the source network device, or the control network device, the method further includes: sending, by the user equipment, a downlink TEID and IP address of the destination network device to the control network device.

According to a second aspect, a user equipment handover method is provided. The method includes receiving, by a destination network device, third information from a control network device or a source network device, where the third information is used to indicate that user equipment requests a handover to the destination network device. The method also includes allocating, by the destination network device, a first uplink resource to the user equipment.

With reference to the second aspect, in a first possible implementation of the second aspect, after the allocating, by the destination network device, a first uplink resource to the user equipment, the method further includes: temporarily adding and sending, by the destination network device, a synchronization signal to the user equipment, where the synchronization signal is used by the user equipment to complete downlink synchronization with the destination network device.

With reference to the second aspect or the first possible implementation of the second aspect, in a second possible implementation of the second aspect, after the allocating, by the destination network device, a first uplink resource to the user equipment, the method further includes: sending, by the destination network device, second information to the user equipment, where the second information is used to notify the user equipment of the first uplink resource allocated to the user equipment by the destination network device; or sending, by the destination network device, fourth information to the control network device, where the fourth information is used to notify the control network device of the first uplink resource allocated to the user equipment by the destination network device.

With reference to the second aspect or the first possible implementation or the second possible implementation of the second aspect, in a third possible implementation of the second aspect, after the allocating, by the destination network device, a first uplink resource to the user equipment, the method further includes: sending, by the destination network device to the user equipment, a device identifier allocated to the user equipment, where the device identifier is a unique identifier of the user equipment within a coverage area of the destination network device; or sending, by the destination network device to the control network device, a device identifier allocated to the user equipment, where the device identifier is a unique identifier of the user equipment within a coverage area of the destination network device.

With reference to the second aspect or the first possible implementation or the second possible implementation or the third possible implementation of the second aspect, in a fourth possible implementation of the second aspect, the first uplink resource is a PUSCH resource or a PUCCH resource.

With reference to the fourth possible implementation of the second aspect, in a fifth possible implementation of the second aspect, after the allocating, by the destination network device, a first uplink resource to the user equipment, the method further includes: if the first uplink resource is the PUCCH resource, receiving, by the destination network device by using the first uplink resource, scheduling request information sent by the user equipment; or if the first uplink resource is the PUSCH resource, receiving, by the destination network device by using the first uplink resource, a buffer status report or a data packet sent by the user equipment.

According to a third aspect, a user equipment handover method is provided. The method includes receiving, by a control network device, first information from user equipment, where the first information is used to indicate that the user equipment requests a handover from a source network device to a destination network device. The method also includes sending, by the control network device, third information to the destination network device, and requesting the destination network device to allocate a first uplink resource to the user equipment, where the third information is used to indicate that the user equipment requests a handover to the destination network device.

With reference to the third aspect, in a first possible implementation of the third aspect, after the requesting, by the control network device, the destination network device to allocate a first uplink resource to the user equipment, the method further includes: receiving, by the control network device, fourth information from the destination network device, where the fourth information is used to notify the control network device of the first uplink resource allocated to the user equipment by the destination network device; and sending, by the control network device, second information to the user equipment according to the fourth information, where the second information is used to notify the user equipment of the first uplink resource allocated to the user equipment by the destination network device.

With reference to the third aspect or the first possible implementation of the third aspect, in a second possible implementation of the third aspect, after the requesting, by the control network device, the destination network device to allocate a first uplink resource to the user equipment, the method further includes: notifying, by the control network device, a symbol location of a synchronization signal to the user equipment, where the synchronization signal is a signal that is temporarily added and sent to the user equipment by the destination network device and that is used by the user equipment to complete downlink synchronization with the destination network device.

With reference to the third aspect or the first possible implementation or the second possible implementation of the third aspect, in a third possible implementation of the third aspect, after the requesting, by the control network device, the destination network device to allocate a first uplink resource to the user equipment, the method further includes: receiving, by the control network device, a device identifier from the destination network device, where the device identifier is a unique identifier of the user equipment within a coverage area of the destination network device; and sending, by the control network device, the device identifier to the user equipment.

According to a fourth aspect, a user equipment handover method is provided. The method includes receiving, by a source network device to which user equipment belongs, first information from the user equipment, where the first information is used to indicate that the user equipment requests a handover from the source network device to a destination network device. The method also includes sending, by the source network device, third information to the destination network device, and requesting the destination network device to allocate a first uplink resource to the user equipment, where the third information is used to indicate that the user equipment requests a handover from the source network device to the destination network device.

With reference to the fourth aspect, in a first possible implementation of the fourth aspect, after the receiving, by a source network device, the first information from user equipment, the method further includes: sending, by the source network device, an uplink TEID and IP address of the source network device to the destination network device; and sending, to the user equipment, a received downlink TEID and IP address of the destination network device that are sent by the destination network device according to the uplink TEID and IP address.

According to a fifth aspect, user equipment is provided. The user equipment includes a sending module, configured to send first information to a control network device or a source network device, where the first information is used to request a handover of the user equipment from the source network device to a destination network device. The user equipment also includes a receiving module, configured to receive second information from the destination network device, the source network device, or the control network device, where the second information is used to notify the user equipment of a first uplink resource allocated to the user equipment by the destination network device.

With reference to the fifth aspect, in a first possible implementation of the fifth aspect, the receiving module is further configured to: after the sending module sends the first information to the control network device or the source network device, receive a synchronization signal temporarily added and sent by the destination network device, where the synchronization signal is used by the user equipment to complete downlink synchronization with the destination network device.

With reference to the fifth aspect or the first possible implementation of the fifth aspect, in a second possible implementation of the fifth aspect, the receiving module is further configured to: receive a symbol location of the synchronization signal from the control network device, the destination network device, or the source network device before receiving the synchronization signal temporarily added and sent by the destination network device; and the receiving module is further specifically configured to: receive, according to the received symbol location, the synchronization signal temporarily added and sent by the destination network device.

With reference to the fifth aspect or the first possible implementation or the second possible implementation of the fifth aspect, in a third possible implementation of the fifth aspect, the receiving module is further configured to: receive a device identifier from the destination network device or the control network device after the sending module sends the first information to the control network device or the source network device, where the device identifier is a unique identifier of the user equipment within a coverage area of the destination network device.

With reference to the fifth aspect or the first possible implementation or the second possible implementation or the third possible implementation of the fifth aspect, in a fourth possible implementation of the fifth aspect, the first uplink resource is a PUSCH resource or a PUCCH resource.

With reference to the fourth possible implementation of the fifth aspect, in a fifth possible implementation of the fifth aspect, the sending module is further configured to: after the receiving module receives the second information from the destination network device, the source network device, or the control network device, if the first uplink resource is the PUSCH resource, send a buffer status report or a data packet to the destination network device by using the first uplink resource; or after the receiving module receives the second information from the destination network device, the source network device, or the control network device, if the first uplink resource is the PUCCH resource, send scheduling request information to the destination network device by using the first uplink resource.

With reference to any one of the fifth aspect or the first to the fifth possible implementations of the fifth aspect, in a sixth possible implementation of the fifth aspect, the sending module is further configured to: send a downlink TEID and IP address of the destination network device to the control network device after the receiving module receives the second information from the destination network device, the source network device, or the control network device.

According to a sixth aspect, a network device is provided. The network device includes a receiving module, configured to receive third information from a control network device or a source network device, where the third information is used to indicate that user equipment requests a handover to the network device. The network device also includes an allocation module, configured to allocate a first uplink resource to the user equipment.

With reference to the sixth aspect, in a first possible implementation of the sixth aspect, the network device further includes a sending module, configured to: temporarily add and send a synchronization signal to the user equipment after the allocation module allocates the first uplink resource to the user equipment, where the synchronization signal is used by the user equipment to complete downlink synchronization with the network device.

With reference to the sixth aspect or the first possible implementation of the sixth aspect, in a second possible implementation of the sixth aspect, the sending module is further configured to: send second information to the user equipment after the allocation module allocates the first uplink resource to the user equipment, where the second information is used to notify the user equipment of the first uplink resource allocated to the user equipment by the network device; or send fourth information to the control network device after the allocation module allocates the first uplink resource to the user equipment, where the fourth information is used to notify the network device of the first uplink resource allocated to the user equipment by the network device.

With reference to the sixth aspect or the first possible implementation or the second possible implementation of the sixth aspect, in a third possible implementation of the sixth aspect, the sending module is further configured to: send, to the user equipment, a device identifier allocated to the user equipment after the allocation module allocates the first uplink resource to the user equipment, where the device identifier is a unique identifier of the user equipment within a coverage area of the network device; or send, to the control network device, a device identifier allocated to the user equipment after the allocation module allocates the first uplink resource to the user equipment, where the device identifier is a unique identifier of the user equipment within a coverage area of the network device.

With reference to the sixth aspect or the first possible implementation or the second possible implementation or the third possible implementation of the sixth aspect, in a fourth possible implementation of the sixth aspect, the first uplink resource is a PUSCH resource or a PUCCH resource.

With reference to the fourth possible implementation of the sixth aspect, in a fifth possible implementation of the sixth aspect, the receiving module is further configured to: after the allocation module allocates the first uplink resource to the user equipment, if the first uplink resource is the PUCCH resource, receive, by using the first uplink resource, scheduling request information sent by the user equipment; or after the allocation module allocates the first uplink resource to the user equipment, if the first uplink resource is the PUSCH resource, receive, by using the first uplink resource, a buffer status report or a data packet sent by the user equipment.

According to a seventh aspect, a network device is provided. The network device includes a receiving module, configured to receive first information from user equipment, where the first information is used to indicate that the user equipment requests a handover from a source network device to a destination network device. The network device also includes a sending module, configured to: send third information to the destination network device, and request the destination network device to allocate a first uplink resource to the user equipment, where the third information is used to indicate that the user equipment requests a handover to the destination network device.

With reference to the seventh aspect, in a first possible implementation of the seventh aspect, the receiving module is further configured to: after the sending module requests the destination network device to allocate the first uplink resource to the user equipment, receive fourth information sent by the destination network device, where the fourth information is used to notify the network device of the first uplink resource allocated to the user equipment by the destination network device; and the sending module is further configured to send second information to the user equipment according to the fourth information, where the second information is used to notify the user equipment of the first uplink resource allocated to the user equipment by the destination network device.

With reference to the seventh aspect or the first possible implementation of the seventh aspect, in a second possible implementation of the seventh aspect, the sending module is further configured to: notify a symbol location of a synchronization signal to the user equipment after requesting the destination network device to allocate the first uplink resource to the user equipment, where the synchronization signal is a signal that is temporarily added and sent to the user equipment by the destination network device and that is used by the user equipment to complete downlink synchronization with the destination network device.

With reference to the seventh aspect or the first possible implementation or the second possible implementation of the seventh aspect, in a third possible implementation of the seventh aspect, the receiving module is further configured to: after the sending module requests the destination network device to allocate the first uplink resource to the user equipment, receive a device identifier sent by the destination network device, where the device identifier is a unique identifier of the user equipment within a coverage area of the destination network device; and the sending module is further configured to send the device identifier to the user equipment.

According to an eighth aspect, a network device is provided. The network device also includes a receiving module, configured to receive first information from user equipment, where the first information is used to indicate that the user equipment requests a handover from the network device to a destination network device. The network device also includes a sending module, configured to: send third information to the destination network device, and request the destination network device to allocate a first uplink resource to the user equipment, where the third information is used to indicate that a handover of the user equipment from the network device to the destination network device is requested.

With reference to the eighth aspect, in a first possible implementation of the eighth aspect, the sending module is further configured to: send an uplink TEID and IP address of the network device to the destination network device after the receiving module receives the first information from the user equipment; and send, to the user equipment, a downlink TEID and IP address of the destination network device that are sent by the destination network device according to the uplink TEID and IP address and that are received by the receiving module.

According to a ninth aspect, user equipment is provided. The user equipment includes a transmitter, configured to send first information to a control network device or a source network device, where the first information is used to request a handover of the user equipment from the source network device to a destination network device. The user equipment also includes a receiver, configured to receive second information from the destination network device, the source network device, or the control network device, where the second information is used to notify the user equipment of a first uplink resource allocated to the user equipment by the destination network device.

With reference to the ninth aspect, in a first possible implementation of the ninth aspect, the receiver is further configured to: after the transmitter sends the first information to the control network device or the source network device, receive a synchronization signal temporarily added and sent by the destination network device, where the synchronization signal is used by the user equipment to complete downlink synchronization with the destination network device.

With reference to the ninth aspect or the first possible implementation of the ninth aspect, in a second possible implementation of the ninth aspect, the receiver is specifically configured to: receive a symbol location of the synchronization signal from the control network device, the destination network device, or the source network device before receiving the synchronization signal temporarily added and sent by the destination network device; and receive, according to the received symbol location, the synchronization signal temporarily added and sent by the destination network device.

With reference to the ninth aspect or the first possible implementation or the second possible implementation of the ninth aspect, in a third possible implementation of the ninth aspect, the receiver is further configured to: receive a device identifier from the destination network device or the control network device after the transmitter sends the first information to the control network device or the source network device, where the device identifier is a unique identifier of the user equipment within a coverage area of the destination network device.

With reference to the ninth aspect or the first possible implementation or the second possible implementation or the third possible implementation of the ninth aspect, in a fourth possible implementation of the ninth aspect, the first uplink resource is a PUSCH resource or a PUCCH resource.

With reference to the fourth possible implementation of the ninth aspect, in a fifth possible implementation of the ninth aspect, the transmitter is further configured to: after the receiver receives the second information from the destination network device, the source network device, or the control network device, if the first uplink resource is the PUSCH resource, send a buffer status report or a data packet to the destination network device by using the first uplink resource; or after the receiver receives the second information from the destination network device, the source network device, or the control network device, if the first uplink resource is the PUCCH resource, send scheduling request information to the destination network device by using the first uplink resource.

With reference to any one of the ninth aspect or the first to the fifth possible implementations of the ninth aspect, in a sixth possible implementation of the ninth aspect, the transmitter is further configured to: send a downlink TEID and IP address of the destination network device to the control network device after the receiver receives the second information from the destination network device, the source network device, or the control network device.

According to a tenth aspect, a network device is provided. The network device includes a receiver, configured to receive third information from a control network device or a source network device, where the third information is used to indicate that user equipment requests a handover to the network device. The network device also includes a processor, configured to allocate a first uplink resource to the user equipment.

With reference to the tenth aspect, in a first possible implementation of the tenth aspect, the network device further includes a transmitter, configured to: temporarily add and send a synchronization signal to the user equipment after the processor allocates the first uplink resource to the user equipment, where the synchronization signal is used by the user equipment to complete downlink synchronization with the network device.

With reference to the tenth aspect or the first possible implementation of the tenth aspect, in a second possible implementation of the tenth aspect, the transmitter is further configured to: send second information to the user equipment after the processor allocates the first uplink resource to the user equipment, where the second information is used to notify the user equipment of the first uplink resource allocated to the user equipment by the network device; or send fourth information to the control network device after the processor allocates the first uplink resource to the user equipment, where the fourth information is used to notify the control network device of the first uplink resource allocated to the user equipment by the network device.

With reference to the tenth aspect or the first possible implementation or the second possible implementation of the tenth aspect, in a third possible implementation of the tenth aspect, the transmitter is further configured to: send, to the user equipment, a device identifier allocated to the user equipment after the processor allocates the first uplink resource to the user equipment, where the device identifier is a unique identifier of the user equipment within a coverage area of the network device; or send, to the control network device, a device identifier allocated to the user equipment after the processor allocates the first uplink resource to the user equipment, where the device identifier is a unique identifier of the user equipment within a coverage area of the network device.

With reference to the tenth aspect or the first possible implementation or the second possible implementation or the third possible implementation of the tenth aspect, in a fourth possible implementation of the tenth aspect, the first uplink resource is a PUSCH resource or a PUCCH resource.

With reference to the fourth possible implementation of the tenth aspect, in a fifth possible implementation of the tenth aspect, the receiver is further configured to: after the processor allocates the first uplink resource to the user equipment, if the first uplink resource is the PUCCH resource, receive, by using the first uplink resource, scheduling request information sent by the user equipment; or after the processor allocates the first uplink resource to the user equipment, if the first uplink resource is the PUSCH resource, receive, by using the first uplink resource, a buffer status report or a data packet sent by the user equipment.

According to an eleventh aspect, a network device is provided. The network device includes a receiver, configured to receive first information from user equipment, where the first information is used to indicate that the user equipment requests a handover from a source network device to a destination network device. The network device also includes a transmitter, configured to: send third information to the destination network device, and request the destination network device to allocate a first uplink resource to the user equipment, where the third information is used to indicate that the user equipment requests a handover to the destination network device.

With reference to the eleventh aspect, in a first possible implementation of the eleventh aspect, the receiver is further configured to: after the transmitter requests the destination network device to allocate the first uplink resource to the user equipment, receive fourth information from the destination network device, where the fourth information is used to notify the network device of the first uplink resource allocated to the user equipment by the destination network device; and the transmitter is further configured to send second information to the user equipment according to the fourth information, where the second information is used to notify the user equipment of the first uplink resource allocated to the user equipment by the destination network device.

With reference to the eleventh aspect or the first possible implementation of the eleventh aspect, in a second possible implementation of the eleventh aspect, the transmitter is further configured to: notify a symbol location of a synchronization signal to the user equipment after requesting the destination network device to allocate the first uplink resource to the user equipment, where the synchronization signal is a signal that is temporarily added and sent to the user equipment by the destination network device and that is used by the user equipment to complete downlink synchronization with the destination network device.

With reference to the eleventh aspect or the first possible implementation or the second possible implementation of the eleventh aspect, in a third possible implementation of the eleventh aspect, the receiver is further configured to: after the transmitter requests the destination network device to allocate the first uplink resource to the user equipment, receive a device identifier from the destination network device, where the device identifier is a unique identifier of the user equipment within a coverage area of the destination network device; and the transmitter is further configured to send the device identifier to the user equipment.

According to a twelfth aspect, a network device is provided. The network device includes a receiver, configured to receive first information from user equipment, where the first information is used to indicate that the user equipment requests a handover from the network device to a destination network device. The network device also includes a transmitter, configured to: send third information to the destination network device, and request the destination network device to allocate a first uplink resource to the user equipment, where the third information is used to indicate that the user equipment requests a handover from the network device to the destination network device.

With reference to the twelfth aspect, in a first possible implementation of the twelfth aspect, the transmitter is further configured to: send an uplink TEID and IP address of the network device to the destination network device after the receiver receives the first information; and send, to the user equipment, a downlink TEID and IP address of the destination network device that are sent by the destination network device according to the uplink TEID and IP address and that are received by the receiver.

In the embodiments of the present invention, when a handover is to be performed, user equipment may send first information that is used to request a handover, then a destination network device may allocate a first uplink resource to the user equipment, and a user equipment may receive second information that is used to notify the user equipment of the first uplink resource allocated to the user equipment by the destination network device. In this way, the user equipment may directly send information to the destination network device by using the first uplink resource. That is, by means of the method in the embodiments of the present invention, during a handover, user equipment does not need to contend for an uplink resource by performing a random access procedure. A destination network device may directly reserve an uplink resource for the user equipment. This reduces steps that need to be performed during the handover of the user equipment, reduces a time required for the handover of the user equipment, and improves handover efficiency of the user equipment.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
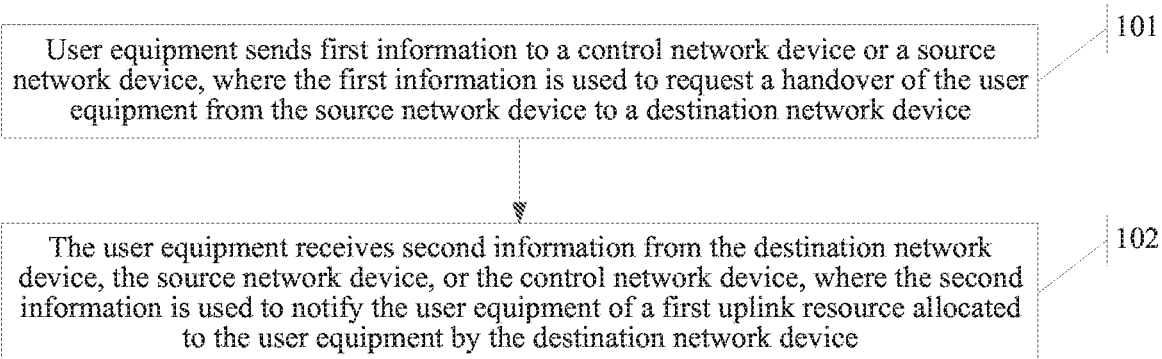
FIG. 1 is a main flowchart of a user equipment handover method on a user equipment side according to an embodiment of the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

A technology described in this specification may be used in various communications systems, for example, a current 2nd generation mobile communications system (2G), 3rd generation mobile communications system (3G), or next-generation communications system, such as a global system for mobile communications (GSM) system, a code division multiple access (CDMA) system, a time division multiple access (TDMA) system, a wideband code division multiple access (WCDMA) system, a frequency division multiple access (FDMA) system, an orthogonal frequency-division multiple access (OFDMA) system, a single carrier FDMA (SC-FDMA) system, a general packet radio service (GPRS) system, a long term evolution (LTE) system, or another such communications system.

This specification describes various aspects with reference to user equipment and/or a network device.

The user equipment may be a wireless terminal or a wired terminal. The wireless terminal may be a device that provides a user with voice and/or data connectivity, a handheld device with a radio connection function, or another processing device connected to a radio modem. The wireless terminal may communicate with one or more core networks by using a radio access network (RAN). The wireless terminal may be a mobile terminal, such as a mobile phone (also referred to as a "cellular" phone) or a computer with a mobile terminal, for example, may be a portable mobile apparatus, a pocket-sized mobile apparatus, a handheld mobile apparatus, a computer built-in mobile apparatus, or an in-vehicle mobile apparatus, which exchanges voice and/or data with the radio access network. For example, it may be a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile terminal, a remote station, an access point (AP), a remote terminal, an access terminal, a user terminal, a user agent, or a user device.

A network device is, for example, a base station or an access point, and may be specifically a device communicating a wireless terminal via one or more sectors on an air interface in an access network. The base station may be configured to mutually convert a received over-the-air frame and internet protocol (IP) packet and serve as a router between the wireless terminal and a rest portion of the access network. The rest portion of the access network may include an IP network. The base station may coordinate attribute management of the air interface.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, unless otherwise specified, the character "/" in this specification generally indicates an "or" relationship between the associated objects.

In the embodiments of the present invention, a network device accessed by user equipment before a handover is referred to as a source network device. A network device to which the user equipment requests to be handed over is referred to as a destination network device. A network device responsible for information transmission between the source network device and destination network device, and a core network is referred to as a control network device. In addition, in the embodiments of the present invention, the source network device and the destination network device are controlled by a same control network device.

In the embodiments of the present invention, the control network device is a control plane network device. The source network device and the destination network device are user plane network devices. The user equipment is to be handed over on a user plane. The control network device is responsible for information transmission between a user plane and a control plane. One control network device may control multiple network devices. For example, if the network device is a base station, the base station may be classified as a control plane base station or a user plane base station. The control plane base station is responsible for information exchange between a user plane base station and a core network. One control plane base station may control multiple user plane base stations.

For example, the user equipment first accesses the source network device, and transmits data to the source network device by using an uplink resource allocated to the user equipment by the source network device. Subsequently, the user equipment moves, and may move to a control range of another network device. In this case, the user equipment needs to be handed over from the source network device to the network device. For example, the network device is referred to as a destination network device, and the source network device and the destination network device are both controlled by a same control network device. In this case, a handover may be performed by using a method in the embodiments of the present invention. For the present invention, the source network device, the destination network device, and the control network device can support sending on a user plane and a control plane. Preferably, the source network device and the destination network device are used for sending user plane data, and the control network device is used for sending on the control plane data.

The following further describes in detail the embodiments of the present invention with reference to the accompanying drawings of this specification.

Referring to FIG. 1, FIG. 1 shows a first user equipment handover method described in an embodiment of the present invention. A main procedure of the method is described as follows.

Step 101: User equipment sends first information to a control network device or a source network device, where the first information is used to request a handover of the user equipment from the source network device to a destination network device.

When the user equipment needs to be handed over to the destination network device, the user equipment may send the first information to the control network device or the source network device. The first information may be a layer 3 report, a packet data convergence protocol (PDCP) report, a MAC report, or a physical layer report. In this embodiment of the present invention, preferably, if the user equipment sends the first information to the control network device, the first information may be a measurement report (MR). If the user equipment sends the first information to the source network device, the first information may be media access control (MAC) packet or physical layer report information. Layer 3 may be a radio resource control (RRC) layer. Optionally, a report may be used to request a handover of the user equipment from the source network device to the destination network device, and the report may be triggered based on signal quality or load, a service requirement, or the like.

The MR may include an event report that a measured quantity measured by a measurement pilot of the destination network device is met, or a report that channel state information (CSI) meets a threshold. The event report that the measured quantity measured by the measurement pilot is met may be a measurement report event triggered by a signal measured quantity of the pilot or a report that a channel quality indicator (CQI) is met.

After receiving the first information, the control network device or the source network device may learn that the user equipment requests a handover from the source network device to the destination network device.

Optionally, before requesting a handover to the destination network device, the user equipment may obtain one of the following information to be used in a destination network by the user equipment: bearer configuration information, a cell radio network temporary identifier (C-RNTI), or an access sequence. In addition, the destination network device may also obtain one of the foregoing information before receiving a handover request of the source network device or a control network device.

Optionally, the user equipment may indicate a handover time in the first information. In this way, the control network device or the source network device may notify the handover time to the destination network device, so that the destination network device may send second information to the user equipment according to the indicated handover time. Alternatively, the control network device may instruct, according to the handover time, the destination network device to allocate a first uplink resource to the user equipment. The destination network device notifies the allocated first uplink resource to the control network device, and the control network device sends the second information to the user equipment. The destination network device may send the second information directly to the user equipment, or may send the second information to the user equipment by using the control network device or the source network device.

Optionally, in this embodiment of the present invention, after the sending, by user equipment, first information to a control network device or a source network device, the method further includes: receiving, by the user equipment, a synchronization signal temporarily added and sent by the destination network device, where the synchronization signal is used by the user equipment to complete downlink synchronization with the destination network device.

After learning that the user equipment requests a handover to the destination network device, in addition to allocating the first uplink resource to the user equipment, the destination network device may further temporarily add and send the synchronization signal to the user equipment. The user equipment may complete downlink synchronization with the destination network device according to the received synchronization signal. The synchronization signal is added and sent, so that a synchronization process of the user equipment is accelerated, and a time required for the handover of the user equipment is further reduced.

For example, in an existing system, a destination network device also sends a synchronization signal to user equipment. A synchronization signal is sent usually by using 5 ms as one period. In one period, one primary synchronization signal and one secondary synchronization signal are sent, and the primary synchronization signal is adjacent to the secondary synchronization signal. In this embodiment of the present invention, in one period, in addition to sending one primary synchronization signal and one secondary synchronization signal adjacent to each other, the destination network device may further temporarily add and send at least one primary synchronization signal and/or at least one secondary synchronization signal. Whether to send a primary synchronization signal or a secondary synchronization signal, and a specific quantity of to-be-sent synchronization signals may be specifically determined according to an actual situation. This is not limited in the present invention.

In addition, if another user equipment is using a resource block that is sent by the destination network device and that includes a symbol of a synchronization signal, the control network device, the source network device, or the destination network device may notify a symbol that is used by the user equipment and that is occupied by the synchronization signal to the user equipment, to avoid incorrect receiving by the user equipment. The notification may be sent by using a dedicated channel or a common channel.

Optionally, in this embodiment of the present invention, before the receiving, by the user equipment, a synchronization signal temporarily added and sent by the destination network device, the method further includes: receiving, by the user equipment, a symbol location of the synchronization signal from the control network device, the destination network device, or the source network device.

The receiving, by the user equipment, a synchronization signal temporarily added and sent by the destination network device includes: receiving, by the user equipment according to the received symbol location, the synchronization signal temporarily added and sent by the destination network device.

In this embodiment of the present invention, if the symbol location of the temporarily added synchronization signal is fixed, the symbol location may not be notified to the user equipment. If the symbol location of the temporarily added synchronization signal is not fixed, the control network device, the source network device, or the destination network device may first notify the symbol location of the temporarily added synchronization signal to the user equipment, so that the user equipment may correctly receive, according to the learned symbol location of the synchronization signal, the temporarily added and sent synchronization signal.

Optionally, in this embodiment of the present invention, after the sending, by user equipment, first information to a control network device or a source network device, the method further includes: receiving, by the user equipment, a device identifier from the destination network device or the control network device, where the device identifier is a unique identifier of the user equipment within a coverage area of the destination network device.

Specifically, if a device identifier of the user equipment can be used to uniquely identify the user equipment within a coverage area of the destination network device, the user equipment may continue to use the original device identifier during and after the handover. If a device identifier of the user equipment can be used to uniquely identify the user equipment only within a coverage area of the source network device, and may not be used to uniquely identify the user equipment within the coverage area of the destination network device, during a handover, the destination network device needs to reallocate a device identifier to the user equipment. The reallocated device identifier can be used to uniquely identify the user equipment at least within the coverage area of the destination network device. For example, the reallocated device identifier can be used to uniquely identify the user equipment within the coverage area of the destination network device.

Specifically, the destination network device may allocate a new device identifier to the user equipment when the user equipment still accesses the source network device. Alternatively, the destination network device may allocate a new device identifier to the user equipment after receiving third information (where the third information is used to request a handover of the user equipment to the destination network device) sent by the control network device or the source network device.

After allocating the new device identifier to the user equipment, the destination network device may directly send the new device identifier to the user equipment, or may first send the new device identifier to the control network device, and then the control network device sends the new device identifier to the user equipment.

Specifically, in this embodiment of the present invention, the device identifier of the user equipment may be a temporary user identifier such as a C-RNTI.

Optionally, a user identifier that can be used by the user equipment in the destination network device may be obtained in advance before the user equipment sends the first information to the control network device or the source network device.

Step 102: The user equipment receives second information from the destination network device, the source network device, or the control network device, where the second information is used to notify the user equipment of a first uplink resource allocated to the user equipment by the destination network device.

After allocating the first uplink resource to the user equipment, the destination network device may directly send the second information to the user equipment, or the destination network device may send fourth information to the control network device or the source network device. The fourth information is used to notify the control network device or the source network device of the first uplink resource allocated to the user equipment by the destination network device. After receiving a fourth information, the control network device or the source network device sends the second information to the user equipment according to the fourth information. The second information is used to notify the user equipment of the first uplink resource allocated to the user equipment by the destination network device. The fourth information and the second information may be different information, and the second information may be generated according to the fourth information. Alternatively, the fourth information and the second information may be same information.

Optionally, in this embodiment of the present invention, the first uplink resource is a physical uplink shared channel (PUSCH) resource, or the first uplink resource is a physical uplink control channel (PUCCH) resource.

Optionally, in this embodiment of the present invention, after the receiving, by the user equipment, second information from the destination network device, the source network device, or the control network device, the method further includes: if the first uplink resource is the PUSCH resource, sending, by the user equipment, a buffer status report or a data packet to the destination network device by using the first uplink resource; or if the first uplink resource is the PUCCH resource, sending, by the user equipment, scheduling request information to the destination network device by using the first uplink resource.

If the first uplink resource is the PUSCH resource, after completing the downlink synchronization with the destination network device according to the synchronization signal added and sent by the destination network device, the user equipment may send a MAC packet to the destination network device by using the PUSCH resource. The MAC packet includes an amount of data to be sent by the user equipment, for example, a buffer status report (BSR). That is, it may be considered that the user equipment sends the buffer status report to the destination network device by using the PUSCH resource. After receiving the MAC packet, the destination network device learns an approximate amount of data to be sent by the user equipment. Subsequently, the destination network device may allocate a proper PUSCH resource to the user equipment, and the user equipment may continue to send data to the destination network device by using the PUSCH resource. Alternatively, if the first uplink resource is the PUSCH resource, after completing the downlink synchronization with the destination network device according to the synchronization signal added and sent by the destination network device, the user equipment may not report, to the destination network device, an amount of data to be sent by the user equipment, but directly send data to the destination network device by using the PUSCH resource.

If the first uplink resource is the PUCCH resource, after completing the downlink synchronization with the destination network device according to the synchronization signal added and sent by the destination network device, the user equipment may send scheduling request information to the destination network device by using the PUCCH resource. The scheduling request information is used to request the destination network device to allocate a PUSCH resource to the user equipment. After receiving the scheduling request information, the destination network device allocates the PUSCH resource to the user equipment. Subsequently, the user equipment sends, according to the allocated PUSCH resource, a buffer status report to or directly sends a data packet to the destination network device.

Optionally, in this embodiment of the present invention, if the first uplink resource is the PUSCH resource, after receiving the second information from the destination network device, the source network device, or the control network device, the user equipment sends handover complete information to the control network device, to notify the control network device that a handover of the user equipment has been completed. The process of sending the handover complete information to the control network device by the user equipment and the process of sending the buffer status report or the data packet to the destination network device by the user equipment by using the PUSCH resource may be performed in random order.

Optionally, in this embodiment of the present invention, if the first uplink resource is the PUCCH resource, after receiving the second information from the destination network device, the source network device, or the control network device, the user equipment sends handover complete information to the control network device to notify the control network device that a handover of the user equipment has been completed. The process of sending the handover complete information to the control network device by the user equipment and the process of sending the scheduling request information to the destination network device by the user equipment by using the PUCCH resource may be performed in random order.

Usually, because a quantity of PUCCH resources is relatively small, the PUCCH resources may be allocated first, and a quantity of allocated resources is relatively small. In this case, overheads allocated in advance are relatively small for a system, thereby saving system resources, and improving resource utilization.

Optionally, in this embodiment of the present invention, after the receiving, by the user equipment, second information from the destination network device, the source network device, or the control network device, the method further includes: when the second information includes a downlink tunnel endpoint identifier (TEID) and internet protocol (IP) address of the destination network device, sending, by the user equipment, the downlink TEID and IP address of the destination network device to the control network device.

A specific scenario is as follows: After receiving the first information sent by the user equipment, the source network device establishes a forwarding tunnel to the destination network device, and notifies an uplink TEID and IP address of the source network device to the destination network device by using the forwarding tunnel. After receiving the uplink TEID and IP address of the source network device, the destination network device notifies the downlink TEID and IP address of the destination network device to the source network device. After the user equipment is handed over to a destination network device, the user equipment sends handover complete information to the control network device. A user may notify the downlink TEID and IP address of the destination network device to the control network device by using the handover complete information. In this way, the control network device may instruct a gateway (for example, a serving gateway (S-GW)/a public data network gateway (P-GW)) to update to a downlink user plane TEID and IP address.

Figure 2:
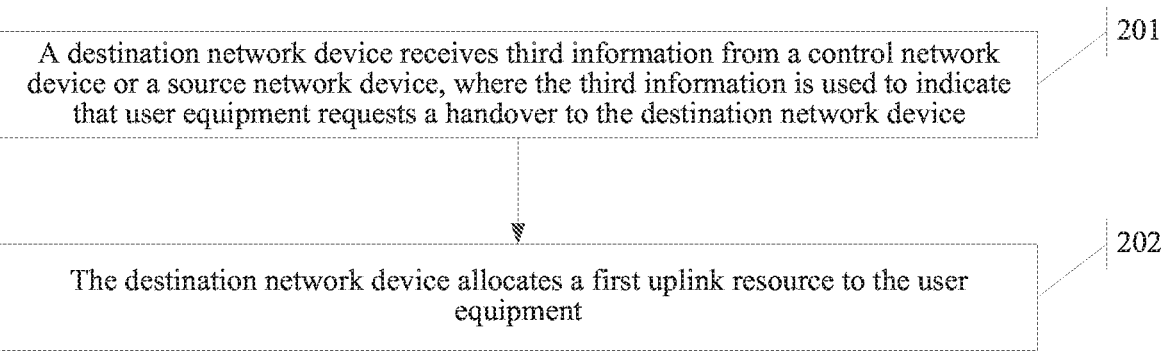
FIG. 2 is a main flowchart of a user equipment handover method on a destination network device side according to an embodiment of the present invention.

Based on a same inventive concept, referring to FIG. 2, FIG. 2 shows a second user equipment handover method according to an embodiment of the present invention. A main procedure of the method is described as follows.

Step 201: A destination network device receives third information from a control network device or a source network device, where the third information is used to indicate that user equipment requests a handover to the destination network device.

When the user equipment needs to be handed over, the user equipment sends first information to the control network device or the source network device. The first information is used to request a handover of the user equipment from the source network device to the destination network device. In this case, if the control network device receives the first information, the control network device sends the third information to the destination network device according to the first information. If the source network device receives the first information, the source network device sends the third information to the destination network device according to the first information.

Step 202: The destination network device allocates a first uplink resource to the user equipment.

After receiving the third information, the destination network device may directly allocate the first uplink resource to the user equipment. In this way, the user equipment may send information to the destination network device by using the first uplink resource, and the user equipment does not need to contend for an uplink resource of the destination network device by using a random access procedure. This greatly reduces a time required for a handover of the user equipment, and reduces steps required for the handover in comparison with a handover procedure in the prior art.

Optionally, in this embodiment of the present invention, if the user equipment obtains, before receiving the first uplink resource allocated to the user equipment by a destination network device, a dedicated access sequence for accessing the destination network device, the user equipment may first send a dedicated sequence, and the network device allocates the first uplink resource to the user equipment after receiving the dedicated sequence.

Optionally, in this embodiment of the present invention, after the allocating, by the destination network device, a first uplink resource to the user equipment, the method further includes: temporarily adding and sending, by the destination network device, a synchronization signal to the user equipment, where the synchronization signal is used by the user equipment to complete downlink synchronization with the destination network device.

In this embodiment of the present invention, if the symbol location of the temporarily added synchronization signal is fixed, the symbol location may not be notified to the user equipment. If the symbol location of the temporarily added synchronization signal is not fixed, the symbol location of the temporarily added synchronization signal further needs to be notified to the user equipment, so that the user equipment may correctly receive, according to the learned symbol location of the synchronization signal, the temporarily added and sent synchronization signal.

Specifically, if the third information received by the destination network device is sent by the control network device, the symbol location of the temporarily added synchronization signal may be notified to the user equipment by the destination network device or by the control network device. If the third information received by the destination network device is sent by the source network device, the symbol location of the temporarily added synchronization signal may be notified to the user equipment by the destination network device or by the source network device.

In addition to allocating the first uplink resource to the user equipment, the destination network device may further temporarily add and send the synchronization signal to the user equipment. In this way, the user equipment may accelerate downlink synchronization with the destination network device.

Optionally, in this embodiment of the present invention, after the allocating, by the destination network device, a first uplink resource to the user equipment, the method further includes:

sending, by the destination network device, second information to the user equipment, where the second information is used to notify the user equipment of the first uplink resource allocated to the user equipment by the destination network device; or sending, by the destination network device, fourth information to the control network device or the source network device, where the fourth information is used to notify the control network device or the source network device of the first uplink resource allocated to the user equipment by the destination network device.

That is, after allocating the first uplink resource to the user equipment, the destination network device needs to notify the allocated first uplink resource to the user equipment. Only in this way can the user equipment send information to the destination network device by using the first uplink resource. The destination network device may directly notify the first uplink resource to the user equipment. Alternatively, the destination network device may first notify the first uplink resource to the control network device, and then the control network device notifies the first uplink resource to the user equipment.

Optionally, in this embodiment of the present invention, after the allocating, by the destination network device, a first uplink resource to the user equipment, the method further includes:

sending, by the destination network device to the user equipment, a device identifier allocated to the user equipment, where the device identifier is a unique identifier of the user equipment within a coverage area of the destination network device; or sending, by the destination network device to the control network device, a device identifier allocated to the user equipment, where the device identifier is a unique identifier of the user equipment within a coverage area of the destination network device.

Content related to the device identifier is described in the procedure of FIG. 1. If the destination network device needs to reallocate a device identifier to the user equipment, after reallocating the device identifier to the user equipment, the destination network device may directly send the allocated device identifier to the user equipment, or the destination network device may first send the allocated device identifier to the control network device, and then the control network device sends the device identifier to the user equipment.

Optionally, in this embodiment of the present invention, the first uplink resource is a PUSCH resource or a PUCCH resource.

Optionally, in this embodiment of the present invention, after the allocating, by the destination network device, a first uplink resource to the user equipment, the method further includes:

if the first uplink resource is the PUCCH resource, receiving, by the destination network device by using the first uplink resource, scheduling request information sent by the user equipment; or if the first uplink resource is the PUSCH resource, receiving, by the destination network device by using the first uplink resource, a buffer status report or a data packet sent by the user equipment.

As described in the procedure of FIG. 1, after receiving the second information, and completing downlink synchronization with the destination network device by using the added synchronization signal, the user equipment may send different information to the destination network device according to different first uplink resources.

If the first uplink resource is the PUCCH resource, the destination network device receives, by using the first uplink resource, the scheduling request information sent by the user equipment. After receiving the scheduling request information, the destination network device may allocate a PUSCH resource to the user equipment. Subsequently, the destination network device continues to receive the buffer status report or the data packet that is sent by the user equipment by using the PUSCH resource.

In this embodiment of the present invention, the PUSCH resource allocated to the user equipment by the destination network device may be consecutive PUSCH resources, or may be discontinuous (that is, non-consecutive) PUSCH resources.

Figure 3:
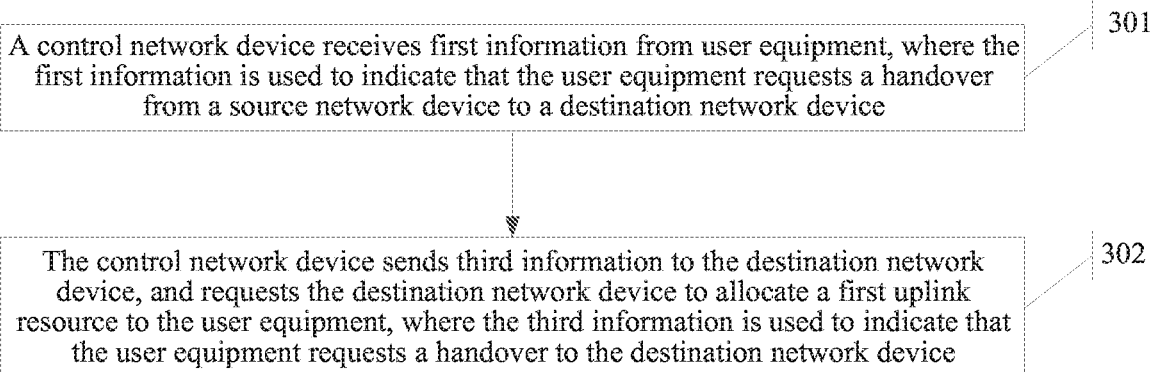
FIG. 3 is a main flowchart of a user equipment handover method on a control network device side according to an embodiment of the present invention.

Based on a same inventive concept, referring to FIG. 3, FIG. 3 shows a third user equipment handover method according to an embodiment of the present invention. A main procedure of the method is described as follows.

Step 301: A control network device receives first information from user equipment, where the first information is used to indicate that the user equipment requests a handover from a source network device to a destination network device.

When the user equipment is to be handed over, the user equipment sends the first information to the control network device or the source network device.

Step 302: The control network device sends third information to the destination network device, and requests the destination network device to allocate a first uplink resource to the user equipment, where the third information is used to indicate that the user equipment requests a handover to the destination network device.

The third information may include a user identifier of the UE in a destination network device.

After receiving the first information, the control network device may send the third information to the destination network device according to the first information, and request the destination network device to allocate the first uplink resource to the user equipment. Specifically, the control network device may add, to the third information, information that is used to request the destination network device to allocate the first uplink resource to the user equipment, and send the third information to the destination network device. Alternatively, the control network device may separately send two pieces of information to the destination network device. One piece of information is the third information, and the other piece of information is information that is used to request the destination network device to allocate the first uplink resource to the user equipment. A specific form of the information is not limited in the present invention.

Optionally, in this embodiment of the present invention, after the requesting, by the control network device, the destination network device to allocate a first uplink resource to the user equipment, the method further includes: receiving, by the control network device, fourth information sent by the destination network device, where the fourth information is used to notify the control network device of the first uplink resource allocated to the user equipment by the destination network device; and sending, by the control network device, second information to the user equipment according to the fourth information, where the second information is used to notify the user equipment of the first uplink resource allocated to the user equipment by the destination network device.

That is, after receiving the third information and the information that is used to request the destination network device to allocate the first uplink resource to the user equipment, the destination network device may allocate the first uplink resource to the user equipment. After allocating the first uplink resource to the user equipment, the destination network device may directly notify the allocated first uplink resource to the user equipment, that is, may directly send the second information to the user equipment. Alternatively, the destination network device may first notify the allocated first uplink resource to the control network device (that is, send the fourth information to the control network device), and then the control network device notifies the allocated first uplink resource to the user equipment (that is, the control network device sends the second information to the user equipment).

Optionally, in this embodiment of the present invention, after the requesting, by the control network device, the destination network device to allocate a first uplink resource to the user equipment, the method further includes: notifying, by the control network device, a symbol location of a synchronization signal to the user equipment, where the synchronization signal is a signal that is temporarily added and sent to the user equipment by the destination network device and that is used by the user equipment to complete downlink synchronization with the destination network device.

As described in the foregoing procedure, if the symbol location of the synchronization signal temporarily added and sent by the destination network device is not fixed, the symbol location of the temporarily added and sent synchronization signal needs to be notified to the user equipment. The symbol location may be directly notified to the user equipment by the destination network device, or may be notified to the user equipment by the control network device.

Optionally, in this embodiment of the present invention, after the requesting, by the control network device, the destination network device to allocate a first uplink resource to the user equipment, the method further includes: receiving, by the control network device, a device identifier sent by the destination network device, where the device identifier is a unique identifier of the user equipment within a coverage area of the destination network device; and sending, by the control network device, the device identifier to the user equipment.

Content related to the device identifier is described in the foregoing procedure. If the destination network device needs to reallocate a device identifier to the user equipment, after reallocating the device identifier to the user equipment, the destination network device may directly send the allocated device identifier to the user equipment, or the destination network device may first send the allocated device identifier to the control network device, and then the control network device sends the device identifier to the user equipment.

Figures 4, 5:
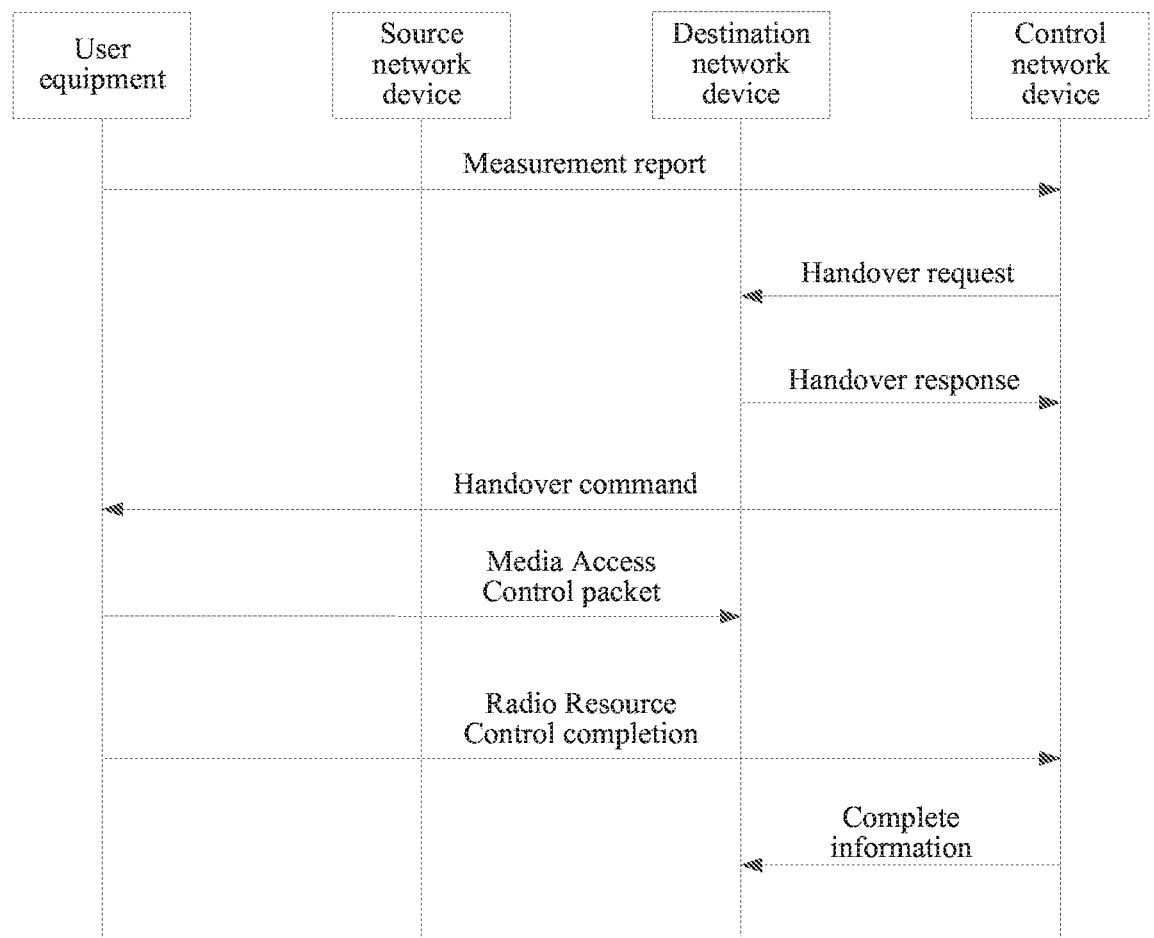
FIG. 4 is a main flowchart of a user equipment handover method on a source network device side according to an embodiment of the present invention.
FIG. 5 is a first complete schematic diagram of a user equipment handover method according to an embodiment of the present invention.

Based on a same inventive concept, referring to FIG. 4, FIG. 4 shows a fourth user equipment handover method according to an embodiment of the present invention. A main procedure of the method is described as follows.

Step 401: A source network device to which user equipment belongs receives first information from the user equipment, where the first information is used to indicate that the user equipment requests a handover from the source network device to a destination network device.

When the user equipment is to be handed over, the user equipment sends the first information to the control network device or the source network device.

Step 402: The source network device sends third information to the destination network device, and requests the destination network device to allocate a first uplink resource to the user equipment, where the third information is used to indicate that the user equipment requests a handover from the source network device to the destination network device.

The third information may include a user identifier to be used by a user in the destination network device.

After receiving the first information, the source network device may send the third information to the destination network device according to the first information, and request the destination network device to allocate the first uplink resource to the user equipment. Specifically, the source network device may add, to the third information, information that is used to request the destination network device to allocate the first uplink resource to the user equipment, and send the third information to the destination network device. Alternatively, the source network device may separately send two pieces of information to the destination network device. One piece of information is the third information, and the other piece of information is information that is used to request the destination network device to allocate the first uplink resource to the user equipment. A specific form of the information is not limited in the present invention.

Optionally, in this embodiment of the present invention, after the receiving, by the source network device, the first information from user equipment, the method further includes: sending, by the source network device, an uplink TEID and IP address of the source network device to the destination network device; and sending, to the user equipment, a received downlink TEID and IP address of the destination network device that are sent by the destination network device according to the uplink TEID and IP address.

A specific scenario is as follows: After receiving the first information sent by the user equipment, the source network device establishes a forwarding tunnel to the destination network device, and notifies an uplink TEID and IP address of the source network device to the destination network device by using the forwarding tunnel. After receiving the uplink TEID and IP address of the source network device, the destination network device notifies the downlink TEID and IP address of the destination network device to the source network device. After completing a handover to a destination network device, the user equipment sends handover complete information to the control network device. A user may notify the downlink TEID and IP address of the destination network device to the control network device by using the handover complete information. In this way, the control network device may instruct a gateway to update a downlink user plane TEID and IP address.

In the embodiments of the present invention, the procedures of FIG. 1 to FIG. 4 are all corresponding procedures, and reference may be mutually made to content of the procedures.

The following describes several detailed handover procedures. The user equipment handover procedure in the embodiments of the present invention is completely described by using a process of interaction between user equipment and each network device. The following examples are merely used to explain the present invention, and should not be used to limit the present invention. In the following examples, UE represents user equipment, an AP 1 represents a control network device, an AP 2 represents a source network device, and an AP 3 represents a destination network device. It should be noted that, in the embodiments of the present invention, in the examples, an AP is used as an example for all network devices. Herein, the AP may refer to a base station, but not a usually mentioned access point in a wireless network.

Example 1

Refer to FIG. 5. UE sends a measurement report to an AP 1. The AP1 sends third information (that is, a handover request in FIG. 5) to an AP 3, to indicate that the UE requests a handover to the AP 3, and the AP 1 requests the AP 3 to allocate PUSCH resources of a period of time. The resources may be consecutive or discontinuous resources. For example, the AP1 may instruct the AP3 to allocate PUSCH resources whose subframe numbers are 1 to 3. The measurement report may include an event report that a measured quantity measured by a measurement pilot of a destination network device is met, or a report that CSI satisfies a threshold. For example, a pilot measurement value of the destination network device is greater than a corresponding value of a source network device, or a value of a channel quality indicator of the destination network device is greater than a threshold.

The AP 3 reserves a PUSCH resource for the UE, and the AP 3 may temporarily add and send a synchronization signal to the UE. The AP 3 sends a handover response to the AP 1.

In addition, if a C-RNTI of the UE can be used to uniquely identify the UE within a coverage area of the AP 1, the UE may continue to use the original C-RNTI. If a C-RNTI of the UE can be used to uniquely identify the UE only within a coverage area of an AP 2, the UE requires the AP 3 to reallocate a C-RNTI that can be used to uniquely identify the UE within a coverage area of the AP 3 or the coverage area of the AP 1. If the destination network device does not obtain the original C-RNTI of the user equipment in advance, a control network device indicates the original C-RNTI of the user equipment in the third information. If the destination network device does not obtain in advance a C-RNTI to be used by the user equipment in the destination network device, the control network device indicates, in the third information, the C-RNTI to be used by the user equipment in the destination network device.

If the AP 3 reallocates a C-RNTI to the UE, after the AP 3 reallocates the C-RNTI to the UE, the AP 3 may send the reallocated C-RNTI to the UE, or the AP 1 may send the reallocated C-RNTI to the UE. In FIG. 5, for example, the AP 1 sends the reallocated C-RNTI to the UE. It can be learned that, if the AP 1 sends the reallocated C-RNTI to the UE, after reallocating the C-RNTI to the UE, the AP 3 needs to send the reallocated C-RNTI to the AP 1 (for example, the reallocated C-RNTI may be carried in a handover response for sending). Subsequently, the AP 1 sends the reallocated C-RNTI to the UE.

The AP 1 notifies, to the UE, an uplink resource allocated to the UE by the AP 3. Specifically, the AP 1 may send a handover command to the UE, and indicate, in the handover command, the uplink resource allocated to the UE by the AP 3. In addition, if a symbol location of the synchronization signal temporarily added and sent by the AP 3 is fixed, the symbol location may not be notified to the UE. If a symbol location of the synchronization signal temporarily added and sent by the AP 3 is not fixed, the symbol location of the synchronization signal temporarily added and sent by the AP 3 needs to be notified to the UE. For example, if there are multiple modes for sending the symbol location of the synchronization signal, a mode identifier may be indicated to the UE. Optionally, when the AP 1 notifies, to the UE, the uplink resource allocated to the UE by the AP 3, the AP 1 may concurrently notify, to the UE, the symbol location of the added and sent synchronization signal. That is, the AP 1 may add the symbol location of the added and sent synchronization signal to the handover command, and send the handover command to the UE.

In addition, if the AP 1 needs to send the reallocated C-RNTI to the UE, the AP 1 may also add the reallocated C-RNTI to the handover command, and send the handover command to the UE.

The handover command herein is equivalent to the second information described in the foregoing procedure.

If another UE is using a resource block that includes a symbol of the synchronization signal sent by the AP 3, the AP 1 or the AP 3 may notify, to the another UE, the symbol occupied by the synchronization signal, to prevent the another UE from performing incorrect receiving.

After receiving the synchronization signal temporarily added and sent by the AP 3, the UE rapidly completes downlink synchronization with the AP 3 according to the temporarily added and sent synchronization signal, and sends a MAC packet to the AP 3 by using the PUSCH resource allocated by the AP 3. The MAC packet includes an amount of data to be sent by the UE, for example, a BSR. The UE sends handover complete information (that is, RRC complete (Radio Resource Control Complete, radio resource control complete)) to the AP 1, to notify the AP 1 that the handover has been completed. After receiving RRC complete, the AP 1 notifies the AP 3 that the handover has been completed (that is, sends complete information to the AP 3).

In FIG. 5, for example, the AP 3 allocates a PUSCH resource to the UE. Specifically, the AP 3 may first allocate a PUCCH resource to the UE. After the UE completes downlink synchronization with the AP 3, the UE first sends scheduling request information to the AP 3 by using the PUCCH resource. After receiving the scheduling request information, the AP 3 then allocates a PUSCH resource to the UE. Subsequently, the UE sends a MAC packet to the AP 3 by using the PUSCH resource.

Example 2

Figure 6:
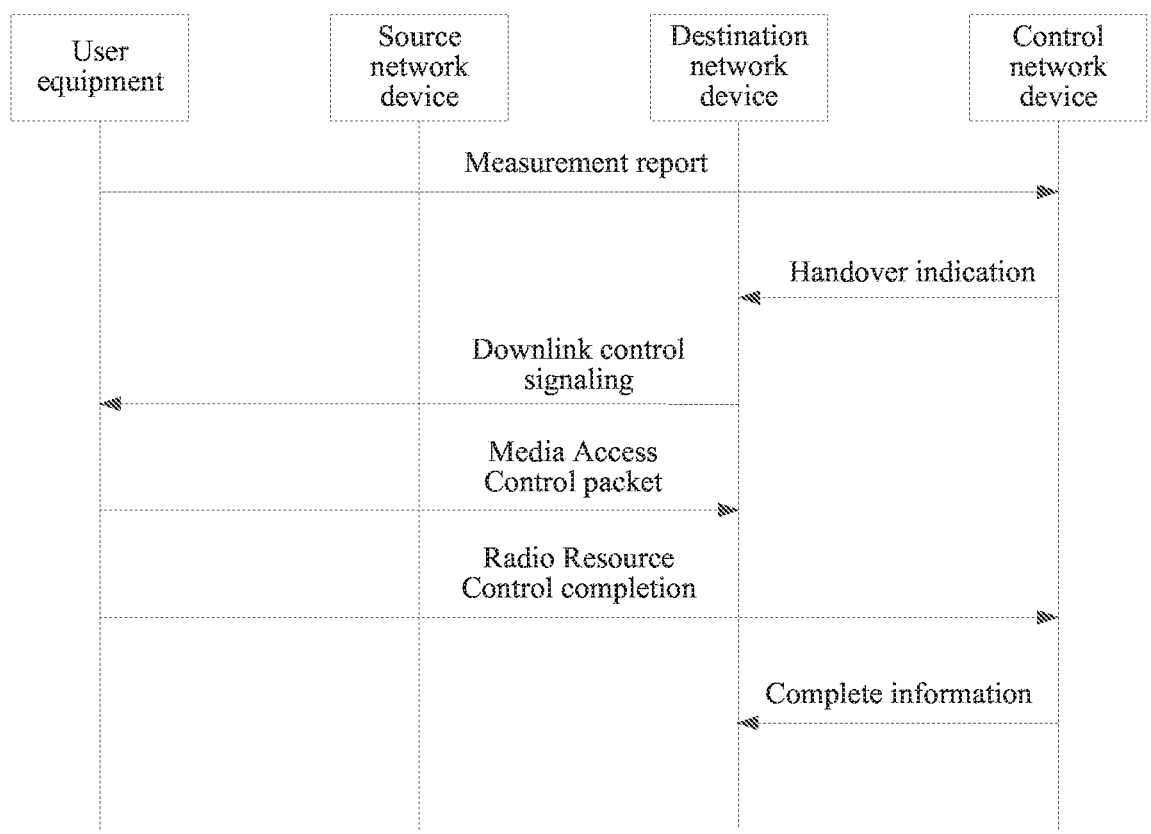
FIG. 6 is a second complete schematic diagram of a user equipment handover method according to an embodiment of the present invention.

Refer to FIG. 6. UE sends a measurement report to an AP 1. Optionally, the UE may indicate, in the measurement report, a time for sending a handover command (that is, second information) by an AP 3.

After receiving the measurement report, the AP 1 sends a handover indication (that is, third information) to the AP 3 to request a hand over of the UE to the AP 3, and requests the AP 3 to allocate an uplink resource to the UE. When the AP 3 learns access of UE, the AP 3 allocates an uplink resource to the UE, for example, allocates a PUSCH resource, and temporarily adds and sends some synchronization signals to the UE.

After completing downlink synchronization with the AP 3 according to the synchronization signals sent by the AP 3, the UE receives, by using a PDCCH (Physical Downlink Control Channel, physical downlink control channel), downlink control signaling (a function of the downlink control signaling is the same as a function of the handover command in the example 1, that is, downlink control signaling may also be equivalent to the second information) sent by the AP 3. The downlink control signaling is used to indicate a PUSCH resource allocated to the UE by the AP 3.

If a C-RNTI needs to be reallocated to the UE, the AP 3 may also add the reallocated C-RNTI to the downlink control signaling, and send the downlink control signaling to the UE.

If the UE obtains a dedicated access sequence of the AP 3 in advance, after completing downlink synchronization with the AP 3, the UE may send a dedicated synchronization sequence to the AP 3. After receiving the dedicated synchronization sequence, the AP 3 then sends downlink control signaling to the UE.

After receiving the downlink control signaling, the UE sends a MAC packet to the AP 3 by using an allocated PUSCH resource, and sends RRC complete to the AP 1, to notify the AP 1 that a handover has been completed. After receiving RRC complete, the AP 1 notifies the AP 3 that the handover has been completed (that is, sends complete information to the AP 3).

Example 3

Figure 7:
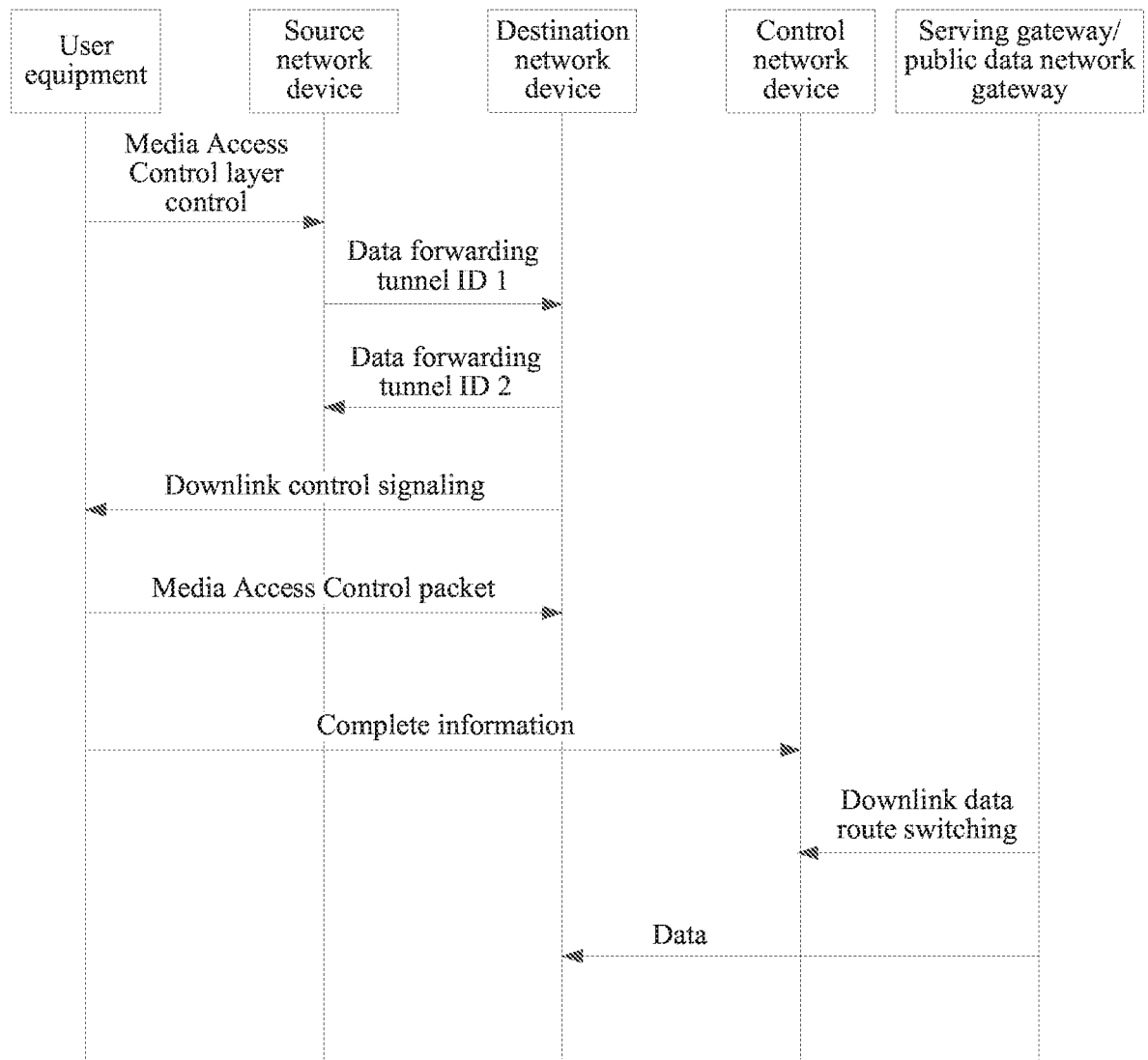
FIG. 7 is a third complete schematic diagram of a user equipment handover method according to an embodiment of the present invention.

Refer to FIG. 7. UE sends a PDCP layer report or MAC control to an AP 2, to indicate, to the AP 2, that the UE requests a handover to an AP 3. Such indication may be performed by using a measurement report event triggered by a pilot or a report that a CQI meets a threshold. Optionally, the UE may indicate, in the MAC control, a handover time.

The AP 2 interacts with the AP 3, and establishes a forwarding tunnel (that is, a data forwarding tunnel ID 1 and a data forwarding tunnel ID2). By using the forwarding tunnel, the AP 2 sends third information to the AP 3, to request to a handover of the UE to the AP 3. In addition, the AP 2 may request the AP 3 to allocate an uplink resource to the UE. Optionally, the AP 2 may further indicate a time for sending downlink control signaling by the AP 3. If a C-RNTI needs to be reallocated to the UE, the AP 2 may instruct the AP 3 to reallocate the C-RNTI to the UE.

When the AP 3 learns access of UE, the AP 3 allocates an uplink resource to the UE, for example, allocates a PUSCH resource, and temporarily adds and sends some synchronization signals to the UE.

The UE receives downlink control signaling that is sent by the AP 3 by using a PDCCH, and the PUSCH resource allocated to the UE by the AP 3 is indicated in the downlink control signaling. The downlink control signaling may optionally carry the C-RNTI that is reallocated to the UE by the AP 3.

After completing downlink synchronization with the AP 3 according to the received synchronization signals, the UE may send, by using the allocated PUSCH resource, a MAC packet carrying a BSR to the AP 3. In addition, the UE sends handover complete information (that is, complete) to the AP 1, to notify the AP 1 that a user plane has been switched to the AP 3. Subsequently, the AP 1 may exchange information with an S-GW/P-GW. The S-GW/P-GW may complete route switching (that is, the AP 1 exchanges a path switching message (a downlink data route switching message of the S-GW) with the S-GW/P-GW). Subsequently, the AP 3 may exchange data (data) with the S-GW/P-GW.

Example 4

Figure 8:
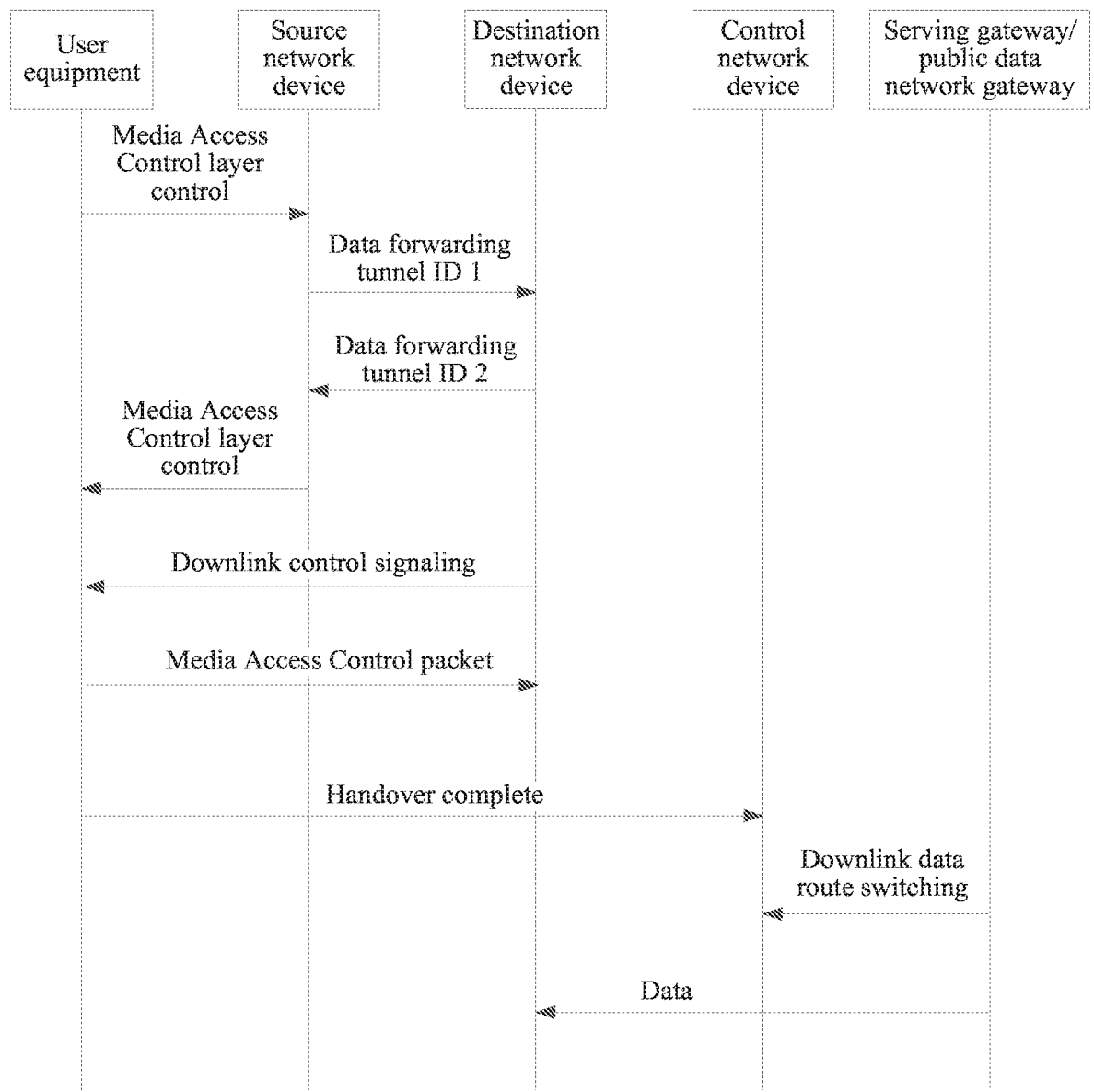
FIG. 8 is a fourth complete schematic diagram of a user equipment handover method according to an embodiment of the present invention.

Refer to FIG. 8. UE sends a PDCP layer report, MAC control, or a physical layer report to an AP 2, to indicate, to the AP 2, that the UE requests a handover to an AP 3. Such indication may be performed by using a measurement report event triggered by a pilot or a report that a CQI meets a threshold. Optionally, the UE may indicate, in MAC control, a handover time.

The AP 2 interacts with the AP 3, and establishes a forwarding tunnel (that is, a data forwarding tunnel ID 1 and a data forwarding tunnel ID2). By using the forwarding tunnel, the AP 2 sends third information to the AP 3, to request a handover of the UE to the AP 3. In addition, the AP 2 may request the AP 3 to allocate an uplink resource to the UE. Optionally, the AP 2 may further indicate a time for sending downlink control signaling by the AP 3. If a C-RNTI needs to be reallocated to the UE, the AP 2 may instruct the AP 3 to reallocate the C-RNTI to the UE. In addition, the AP 2 may further notify an uplink TEID and IP address of the AP 2 to the AP 3 by using the forwarding tunnel. After receiving the uplink TEID and IP address of the AP 2, the AP 3 may notify a downlink TEID and IP address of the AP 3 to the AP 2, so that AP 2 may send the downlink TEID and IP address of the AP 3 to the UE.

When the AP 3 learns access of UE, the AP 3 allocates an uplink resource to the UE, for example, allocates a PUSCH resource, and temporarily adds and sends some synchronization signals to the UE.

The AP 2 sends MAC control or layer 3 signaling to the UE. The MAC control or the layer 3 signaling may carry a downlink TEID of the AP 2.

The UE receives downlink control signaling that is sent by the AP 3 by using a PDCCH, and the PUSCH resource allocated to the UE by the AP 3 is indicated in the downlink control signaling. The downlink control signaling may optionally carry the C-RNTI that is reallocated to the UE by the AP 3.

After completing downlink synchronization with the AP 3 according to the received synchronization signals, the UE may send a MAC packet carrying a BSR to the AP 3 by using the allocated PUSCH resource. In addition, the UE sends handover complete information (that is, handover complete) to the AP 1, to notify the AP 1 that a user plane has been switched to the AP 3. Switch complete may carry the downlink TEID and IP address of the AP 3. The AP 1 may notify the downlink TEID and IP address of the AP 3 to an S-GW/a P-GW (that is, the AP 1 exchanges path switching (a downlink data route switching message of the S-GW) with the S-GW/P-GW). The S-GW/P-GW may switch to a downlink user plane TEID and IP address. Subsequently, the AP 3 may exchange data (data) with the S-GW/P-GW.

The following describes a device in the embodiments of the present invention with reference to the accompanying drawings.

Figure 9:
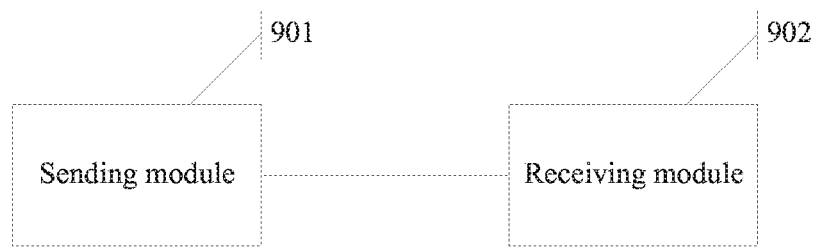
FIG. 9 is a structural block diagram of user equipment according to an embodiment of the present invention.

Referring to FIG. 9, based on a same inventive concept, an embodiment of the present invention provides user equipment, including a sending module 901 and a receiving module 902.

The sending module 901 is configured to send first information to a control network device or a source network device, where the first information is used to request a handover of the user equipment from the source network device to a destination network device.

The receiving module 902 is configured to receive second information from the destination network device, the source network device, or the control network device, where the second information is used to notify the user equipment of a first uplink resource allocated to the user equipment by the destination network device.

Optionally, in this embodiment of the present invention, the receiving module 902 is further configured to: after the sending module 901 sends the first information to the control network device or the source network device, receive a synchronization signal temporarily added and sent by the destination network device, where the synchronization signal is used by the user equipment to complete downlink synchronization with the destination network device.

Optionally, in this embodiment of the present invention, the receiving module 902 is further configured to: receive a symbol location of the synchronization signal from the control network device, the destination network device, or the source network device before receiving the synchronization signal temporarily added and sent by the destination network device; and the receiving module 902 is further specifically configured to: receive, according to the received symbol location, the synchronization signal temporarily added and sent by the destination network device.

Optionally, in this embodiment of the present invention, the receiving module 902 is further configured to: receive a device identifier from the destination network device or the control network device after the sending module 901 sends the first information to the control network device or the source network device, where the device identifier is a unique identifier of the user equipment within a coverage area of the destination network device.

Optionally, in this embodiment of the present invention, the first uplink resource is a PUSCH resource or a PUCCH resource.

Optionally, in this embodiment of the present invention, the sending module 901 is further configured to: after the receiving module 902 receives the second information from the destination network device, the source network device, or the control network device, if the first uplink resource is the PUSCH resource, send a buffer status report or a data packet to the destination network device by using the first uplink resource; or after the receiving module 902 receives the second information from the destination network device, the source network device, or the control network device, if the first uplink resource is the PUCCH resource, send scheduling request information to the destination network device by using the first uplink resource.

Optionally, in this embodiment of the present invention, the sending module 901 is further configured to: send a downlink TEID and IP address of the destination network device to the control network device after the receiving module 902 receives the second information from the destination network device, the source network device, or the control network device.

Figure 10:
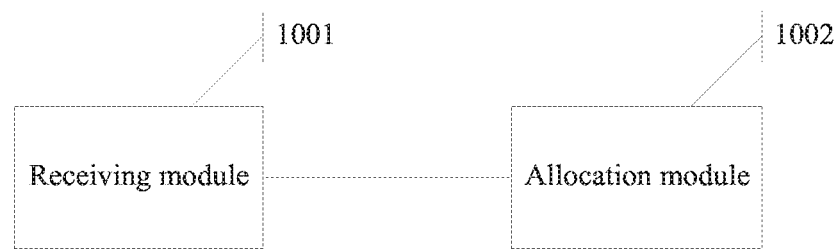
FIG. 10 is a structural block diagram of a destination network device according to an embodiment of the present invention.

Referring to FIG. 10, based on a same inventive concept, an embodiment of the present invention provides a network device. The network device may be the destination network device described above. The network device may include a receiving module 1001 and an allocation module 1002.

The receiving module 1001 is configured to receive third information from a control network device or a source network device, where the third information is used to indicate that user equipment requests a handover to the network device.

The allocation module 1002 is configured to allocate a first uplink resource to the user equipment.

Optionally, in this embodiment of the present invention, the network device further includes a sending module, configured to: temporarily add and send a synchronization signal to the user equipment after the allocation module 1002 allocates the first uplink resource to the user equipment, where the synchronization signal is used by the user equipment to complete downlink synchronization with the network device.

Optionally, in this embodiment of the present invention, the sending module is further configured to: send second information to the user equipment after the allocation module 1002 allocates the first uplink resource to the user equipment, where the second information is used to notify the user equipment of the first uplink resource allocated to the user equipment by the network device; or send fourth information to the control network device after the allocation module 1002 allocates the first uplink resource to the user equipment, where the fourth information is used to notify the user equipment of the first uplink resource allocated to the user equipment by the network device.

Optionally, in this embodiment of the present invention, the sending module is further configured to: send, to the user equipment, a device identifier allocated to the user equipment after the allocation module 1002 allocates the first uplink resource to the user equipment, where the device identifier is a unique identifier of the user equipment within a coverage area of the network device; or send, to the control network device, a device identifier allocated to the user equipment after the allocation module 1002 allocates the first uplink resource to the user equipment, where the device identifier is a unique identifier of the user equipment within a coverage area of the network device.

Optionally, in this embodiment of the present invention, the first uplink resource is a PUSCH resource or a PUCCH resource.

Optionally, in this embodiment of the present invention, the receiving module 1001 is further configured to: after the allocation module 1002 allocates the first uplink resource to the user equipment, if the first uplink resource is the PUCCH resource, receive, by using the first uplink resource, scheduling request information sent by the user equipment; or after the allocation module 1002 allocates the first uplink resource to the user equipment, if the first uplink resource is the PUSCH resource, receive, by using the first uplink resource, a buffer status report or a data packet sent by the user equipment.

Figure 11:
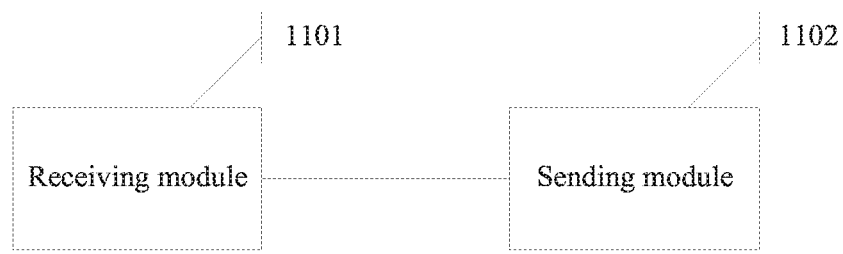
FIG. 11 is a structural block diagram of a control network device according to an embodiment of the present invention.

Referring to FIG. 11, based on a same inventive concept, an embodiment of the present invention provides a network device. The network device may be the control network device described above. The network device may include a receiving module 1101 and a sending module 1102.

The receiving module 1101 is configured to receive first information from user equipment, where the first information is used to indicate that the user equipment requests a handover from a source network device to a destination network device.

The sending module 1102 is configured to: send third information to the destination network device, and request the destination network device to allocate a first uplink resource to the user equipment, where the third information is used to indicate that the user equipment requests a handover to the destination network device.

Optionally, in this embodiment of the present invention, the receiving module 1101 is further configured to: after the sending module 1102 requests the destination network device to allocate the first uplink resource to the user equipment, receive fourth information sent by the destination network device, where the fourth information is used to notify the network device of the first uplink resource allocated to the user equipment by the destination network device; and the sending module 1102 is further configured to send second information to the user equipment according to the fourth information, where the second information is used to notify the user equipment of the first uplink resource allocated to the user equipment by the destination network device.

Optionally, in this embodiment of the present invention, the sending module 1102 is further configured to: notify a symbol location of a synchronization signal to the user equipment after requesting the destination network device to allocate the first uplink resource to the user equipment, where the synchronization signal is a signal that is temporarily added and sent to the user equipment by the destination network device and that is used by the user equipment to complete downlink synchronization with the destination network device.

Optionally, in this embodiment of the present invention, the receiving module 1101 is further configured to: after the sending module 1102 requests the destination network device to allocate the first uplink resource to the user equipment, receive a device identifier sent by the destination network device, where the device identifier is a unique identifier of the user equipment within a coverage area of the destination network device; and the sending module 1102 is further configured to send the device identifier to the user equipment.

Figure 12:
FIG. 12 is a structural block diagram of a source network device according to an embodiment of the present invention.

Referring to FIG. 12, based on a same inventive concept, an embodiment of the present invention provides a network device. The network device may be the source network device described above. The network device may include a receiving module 1201 and a sending module 1202.

The receiving module 1201 is configured to receive first information from user equipment, where the first information is used to indicate that the user equipment requests a handover from the network device to a destination network device.

The sending module 1202 is configured to: send third information to the destination network device, and request the destination network device to allocate a first uplink resource to the user equipment, where the third information is used to indicate that a handover of the user equipment from the network device to the destination network device is requested.

Optionally, in this embodiment of the present invention, the sending module 1202 is further configured to: send an uplink TEID and IP address of the network device to the destination network device after the receiving module 1201 receives the first information from the user equipment; and send, to the user equipment, a downlink TEID and IP address of the destination network device that are sent by the destination network device according to the uplink TEID and IP address and that are received by the receiving module 1201.

Figure 13:
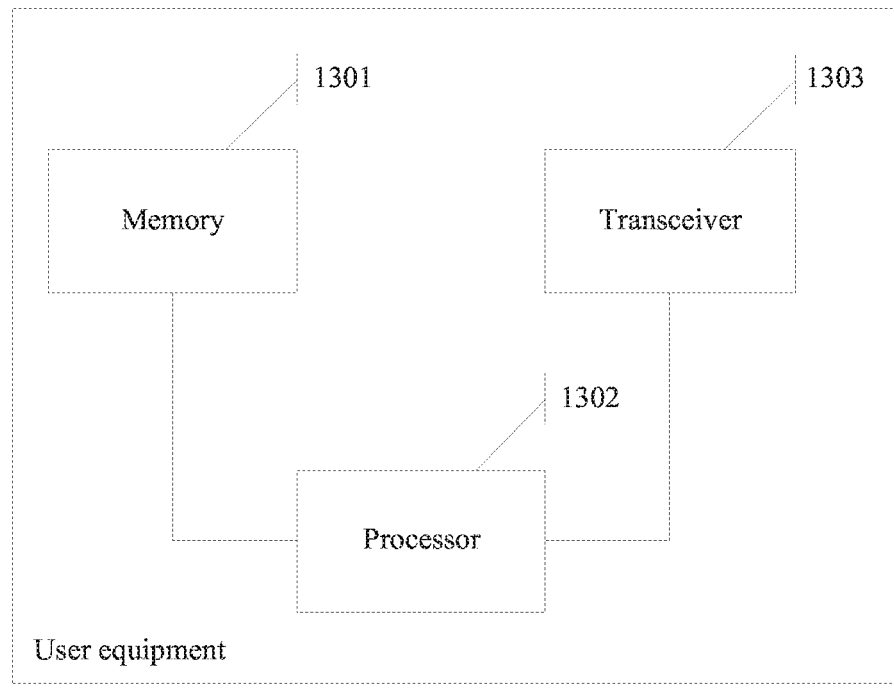
FIG. 13 is a first schematic structural diagram of user equipment according to an embodiment of the present invention.

Referring to FIG. 13, based on a same inventive concept, an embodiment of the present invention provides user equipment. The user equipment may include a memory 1301, a processor 1302, and a transceiver 1303. The memory 1301 and the transceiver 1303 are both connected to the processor 1302.

The memory 1301 is configured to store an instruction required by the processor 1302 to perform a task.

The processor 1302 is configured to execute the instruction stored in the memory 1301, to send, by using the transceiver 1303, first information to a control network device or a source network device, where the first information is used to request a handover of the user equipment from the source network device to a destination network device.

The transceiver 1303 is further configured to receive second information from the destination network device, the source network device, or the control network device, where the second information is used to notify the user equipment of a first uplink resource allocated to the user equipment by the destination network device.

Optionally, in this embodiment of the present invention, the transceiver 1303 is further configured to: after the processor 1302 sends, by using the transceiver 1303, the first information to the control network device or the source network device, receive a synchronization signal temporarily added and sent by the destination network device, where the synchronization signal is used by the user equipment to complete downlink synchronization with the destination network device.

Optionally, in this embodiment of the present invention, the transceiver 1303 is further configured to: receive a symbol location of the synchronization signal from the control network device, the destination network device, or the source network device before receiving the synchronization signal temporarily added and sent by the destination network device; and receive, according to the received symbol location, the synchronization signal temporarily added and sent by the destination network device.

Optionally, in this embodiment of the present invention, the transceiver 1303 is further configured to: receive a device identifier from the destination network device or the control network device after the processor 1302 sends, by using the transceiver 1303, the first information to the control network device or the source network device, where the device identifier is a unique identifier of the user equipment within a coverage area of the destination network device.

Optionally, in this embodiment of the present invention, the first uplink resource is a PUSCH resource or a PUCCH resource.

Optionally, in this embodiment of the present invention, the processor 1302 is further configured to: after the transceiver 1303 receives the second information from the destination network device, the source network device, or the control network device, if the first uplink resource is the PUSCH resource, send, by using the transceiver 1303, a buffer status report or a data packet to the destination network device by using the first uplink resource; or after the transceiver 1303 receives the second information from the destination network device, the source network device, or the control network device, if the first uplink resource is the PUCCH resource, send, by using the transceiver 1303, scheduling request information to the destination network device by using the first uplink resource.

Optionally, in this embodiment of the present invention, the processor 1302 is further configured to: send, by using the transceiver 1303, a downlink TEID and IP address of the destination network device to the control network device after the transceiver 1303 receives the second information from the destination network device, the source network device, or the control network device.

Figure 14:
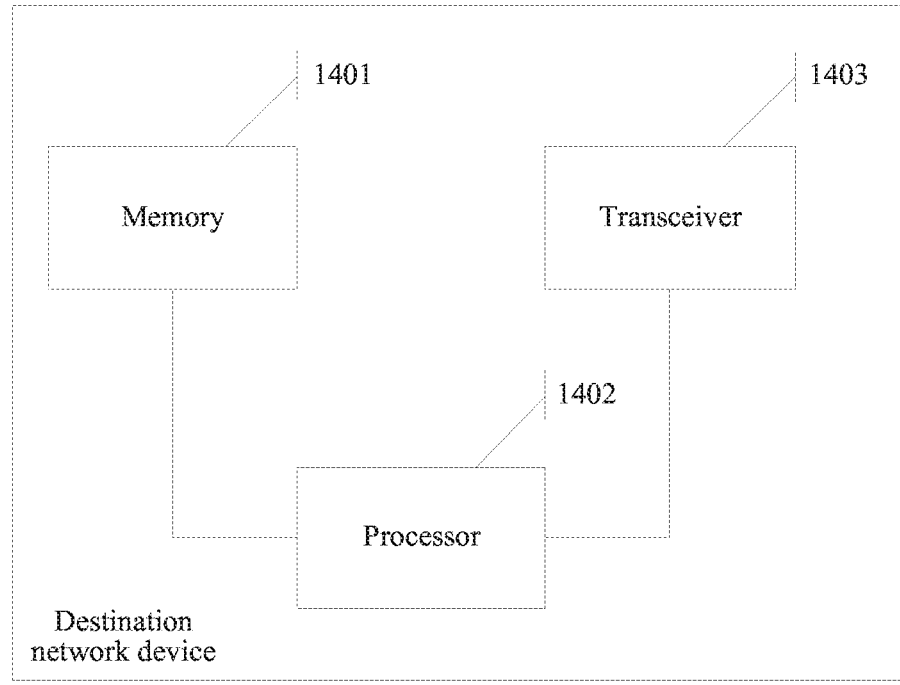
FIG. 14 is a first schematic structural diagram of a destination network device according to an embodiment of the present invention.

Referring to FIG. 14, based on a same inventive concept, an embodiment of the present invention provides a network device. The network device may be the destination network device described above. The network device may include a memory 1401, a processor 1402, and a transceiver 1403. The memory 1401 and the transceiver 1403 are separately connected to the processor 1402.

The memory 1401 is configured to store an instruction required by the processor 1402 to perform a task.

The transceiver 1403 is configured to receive third information from a control network device or a source network device, where the third information is used to indicate that user equipment requests a handover to the network device.

The processor 1402 is configured to execute the instruction stored in the memory 1401, to allocate a first uplink resource to the user equipment.

Optionally, in this embodiment of the present invention, the processor 1402 is further configured to: temporarily add and send, by using the transceiver 1403, a synchronization signal to the user equipment after allocating the first uplink resource to the user equipment, where the synchronization signal is used by the user equipment to complete downlink synchronization with the network device.

Optionally, in this embodiment of the present invention, the processor 1402 is further configured to: send, by using the transceiver 1403, second information to the user equipment after allocating the first uplink resource to the user equipment, where the second information is used to notify the user equipment of the first uplink resource allocated to the user equipment by the network device; or send, by using the transceiver 1403, fourth information to the control network device after allocating the first uplink resource to the user equipment, where the fourth information is used to notify the control network device of the first uplink resource allocated to the user equipment by the network device.

Optionally, in this embodiment of the present invention, the processor 1402 is further configured to: send, by using the transceiver 1403 to the user equipment, a device identifier allocated to the user equipment after allocating the first uplink resource to the user equipment, where the device identifier is a unique identifier of the user equipment within a coverage area of the network device; or send, by using the transceiver 1403 to the control network device, a device identifier allocated to the user equipment after allocating the first uplink resource to the user equipment, where the device identifier is a unique identifier of the user equipment within a coverage area of the network device.

Optionally, in this embodiment of the present invention, the first uplink resource is a PUSCH resource or a PUCCH resource.

Optionally, in this embodiment of the present invention, the transceiver 1403 is further configured to: after the processor 1402 allocates the first uplink resource to the user equipment, if the first uplink resource is the PUCCH resource, receive, by using the first uplink resource, scheduling request information sent by the user equipment; or after the processor 1402 allocates the first uplink resource to the user equipment, if the first uplink resource is the PUSCH resource, receive, by using the first uplink resource, a buffer status report or a data packet sent by the user equipment.

Figure 15:
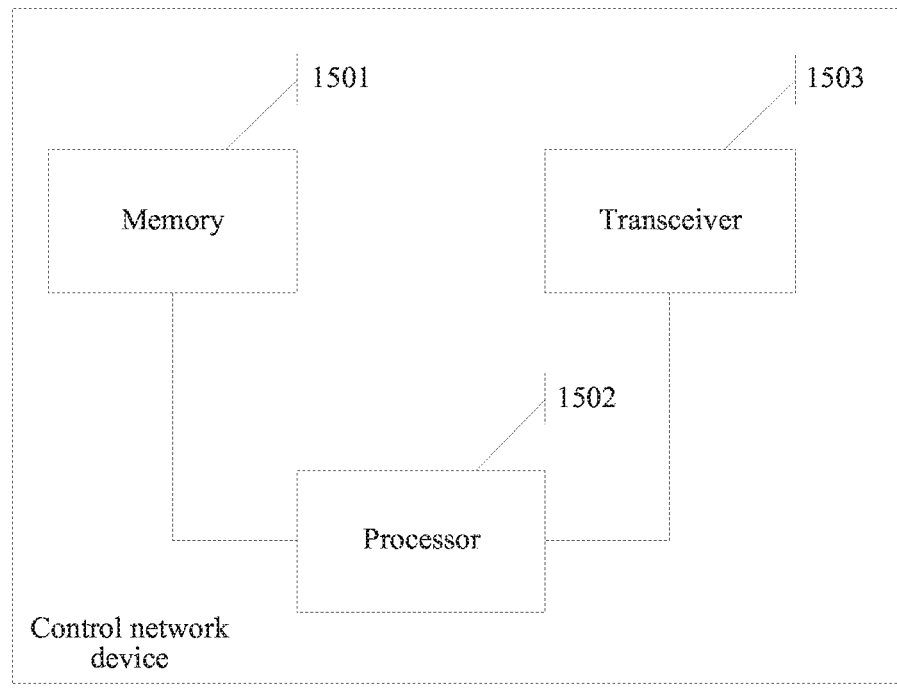
FIG. 15 is a first schematic structural diagram of a control network device according to an embodiment of the present invention.

Referring to FIG. 15, based on a same inventive concept, an embodiment of the present invention provides a network device. The network device may be the control network device described above. The network device may include a memory 1501, a processor 1502, and a transceiver 1503. The memory 1501 and the transceiver 1503 are separately connected to the processor 1502.

The memory 1501 is configured to store an instruction required by the processor 1502 to perform a task.

The transceiver 1503 is configured to receive first information from user equipment, where the first information is used to indicate that the user equipment requests a handover from a source network device to a destination network device.

The processor 1502 is configured to execute the instruction stored in the memory 1501, to send, by using the transceiver 1503, third information to the destination network device and request the destination network device to allocate a first uplink resource to the user equipment, where the third information is used to indicate that the user equipment requests a handover to the destination network device.

Optionally, in this embodiment of the present invention, the transceiver 1503 is further configured to: after the processor 1502 requests, by using the transceiver 1503, the destination network device to allocate a first uplink resource to the user equipment, receive fourth information sent by the destination network device, where the fourth information is used to notify the network device of the first uplink resource allocated to the user equipment by the destination network device; and the processor 1502 is further configured to send, by using the transceiver 1503, the second information to the user equipment according to the fourth information, where the second information is used to notify the user equipment of the first uplink resource allocated to the user equipment by the destination network device.

Optionally, in this embodiment of the present invention, the processor 1502 is further configured to: notify, by using the transceiver 1503, a symbol location of a synchronization signal to the user equipment after requesting the destination network device to allocate the first uplink resource to the user equipment, where the synchronization signal is a signal that is temporarily added and sent to the user equipment by the destination network device and that is used by the user equipment to complete downlink synchronization with the destination network device.

Optionally, in this embodiment of the present invention, the transceiver 1503 is further configured to: after the processor 1502 requests, by using the transceiver 1503, the destination network device to allocate the first uplink resource to the user equipment, receive a device identifier sent by the destination network device, where the device identifier is a unique identifier of the user equipment within a coverage area of the destination network device; and the processor 1502 is further configured to send, by using the transceiver 1503, the device identifier to the user equipment.

Figure 16:
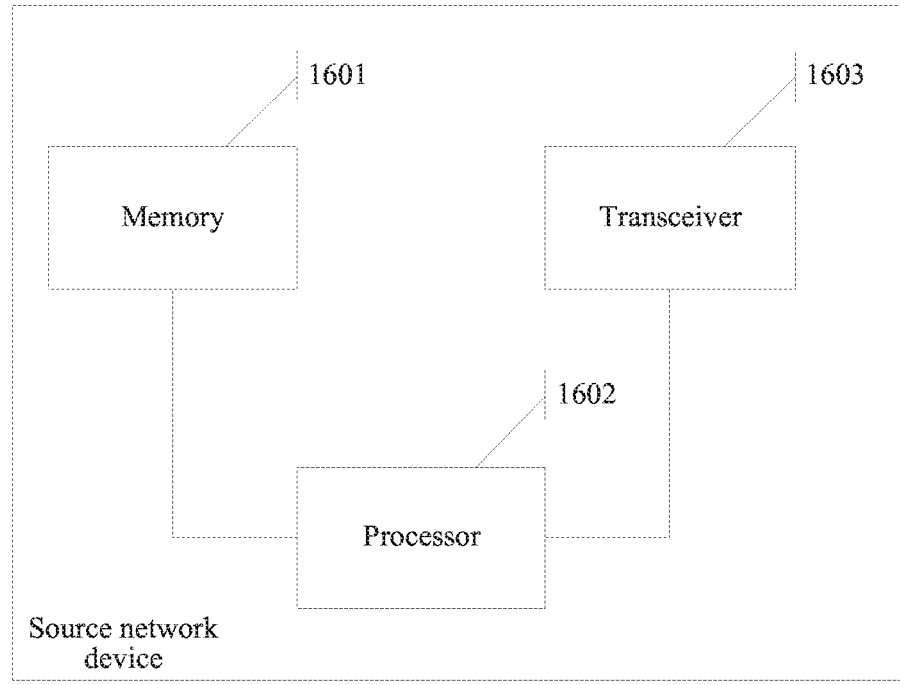
FIG. 16 is a first schematic structural diagram of a source network device according to an embodiment of the present invention.

Referring to FIG. 16, based on a same inventive concept, an embodiment of the present invention provides a network device. The network device may be the source network device described above. The network device may include a memory 1601, a processor 1602, and a transceiver 1603.

The memory 1601 is configured to store an instruction required by the processor 1602 to perform a task.

The receiver 1603 is configured to receive first information from user equipment, where the first information is used to indicate that the user equipment requests a handover from the network device to a destination network device.

The processor 1602 is configured to execute the instruction stored in the memory 1601, to send, by using the transceiver 1603, third information to the destination network device and request the destination network device to allocate a first uplink resource to the user equipment, where the third information is used to indicate that the user equipment requests a handover from the network device to the destination network device.

Optionally, in this embodiment of the present invention, the processor 1602 is further configured to: send, by using the transceiver 1603, an uplink TEID and IP address of the network device to the destination network device after the transceiver 1603 receives the first information; and send, to the user equipment by using the transceiver 1603, a downlink TEID and IP address of the destination network device that are sent by the destination network device according to the uplink TEID and IP address and that are received by the transceiver 1603.

Figure 17:
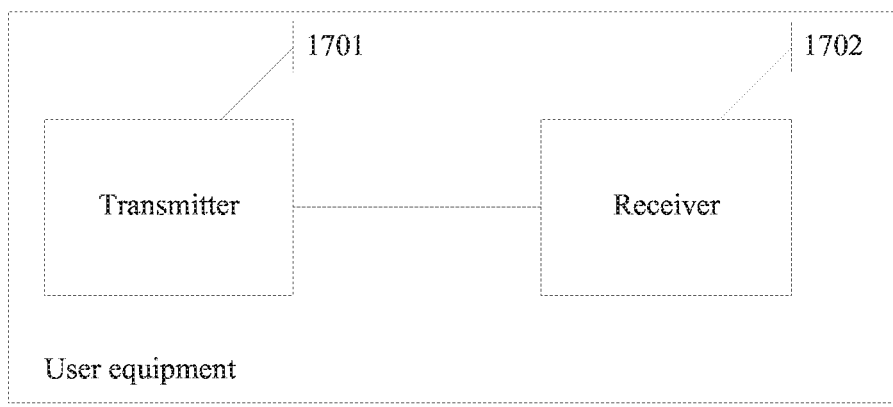
FIG. 17 is a second schematic structural diagram of user equipment according to an embodiment of the present invention.

Referring to FIG. 17, based on a same inventive concept, an embodiment of the present invention provides user equipment. The user equipment may be the user equipment described above. The user equipment may include a transmitter 1701 and a receiver 1702.

The transmitter 1701 is configured to send first information to a control network device or a source network device, where the first information is used to request a handover of the user equipment from the source network device to a destination network device.

The receiver 1702 is configured to receive second information from the destination network device, the source network device, or the control network device, where the second information is used to notify the user equipment of a first uplink resource allocated to the user equipment by the destination network device.

Optionally, in this embodiment of the present invention, the receiver 1702 is further configured to: after the transmitter 1701 sends the first information to the control network device or the source network device, receive a synchronization signal temporarily added and sent by the destination network device, where the synchronization signal is used by the user equipment to complete downlink synchronization with the destination network device.

Optionally, in this embodiment of the present invention, the receiver 1702 is specifically configured to: receive a symbol location of the synchronization signal from the control network device, the destination network device, or the source network device before receiving the synchronization signal temporarily added and sent by the destination network device; and receive, according to the received symbol location, the synchronization signal temporarily added and sent by the destination network device.

Optionally, in this embodiment of the present invention, the receiver 1702 is further configured to: receive a device identifier from the destination network device or the control network device after the transmitter 1701 sends the first information to the control network device or the source network device, where the device identifier is a unique identifier of the user equipment within a coverage area of the destination network device.

Optionally, in this embodiment of the present invention, the first uplink resource is a PUSCH resource or a PUCCH resource.

Optionally, in this embodiment of the present invention, the transmitter 1701 is further configured to: after the receiver 1702 receives the second information from the destination network device, the source network device, or the control network device, if the first uplink resource is the PUSCH resource, send a buffer status report or a data packet to the destination network device by using the first uplink resource; or after the receiver 1702 receives the second information from the destination network device, the source network device, or the control network device, if the first uplink resource is the PUCCH resource, send scheduling request information to the destination network device by using the first uplink resource.

Optionally, in this embodiment of the present invention, the transmitter 1701 is further configured to: send a downlink TEID and IP address of the destination network device to the control network device after the receiver 1702 receives the second information from the destination network device, the source network device, or the control network device.

Figure 18A:
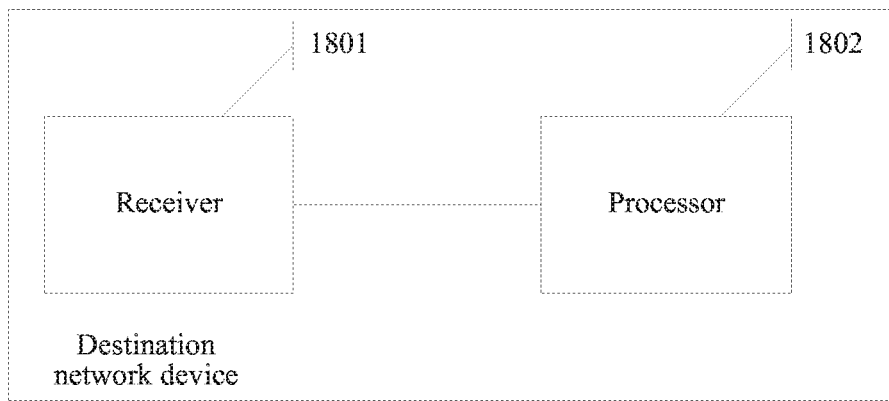
FIG. 18A is a second schematic structural diagram of a destination network device according to an embodiment of the present invention.

Referring to FIG. 18A, based on a same inventive concept, an embodiment of the present invention provides a network device. The network device may be the destination network device described above. The network device may include a receiver 1801 and a processor 1802 that are connected to each other.

The receiver 1801 is configured to receive third information from a control network device or a source network device, where the third information is used to indicate that user equipment requests a handover to the network device.

The processor 1802 is configured to allocate a first uplink resource to the user equipment.

Figure 18B:
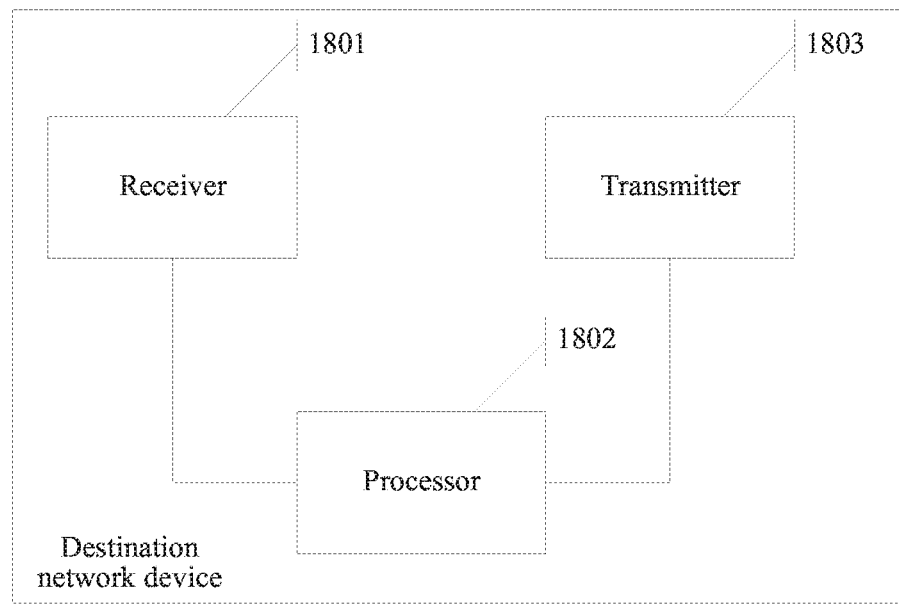
FIG. 18B is a third schematic structural diagram of a destination network device according to an embodiment of the present invention.

Optionally, referring to FIG. 18B, in this embodiment of the present invention, the network device further includes a transmitter 1803 connected to the processor 1802. The transmitter 1803 is configured to: temporarily add and send a synchronization signal to the user equipment after the processor 1802 allocates the first uplink resource to the user equipment, where the synchronization signal is used by the user equipment to complete downlink synchronization with the network device.

Optionally, in this embodiment of the present invention, the transmitter 1803 is further configured to: send second information to the user equipment after the processor 1802 allocates the first uplink resource to the user equipment, where the second information is used to notify the user equipment of the first uplink resource allocated to the user equipment by the network device; or send fourth information to the control network device after the processor 1802 allocates the first uplink resource to the user equipment, where the fourth information is used to notify the network device of the first uplink resource allocated to the user equipment by the network device.

Optionally, in this embodiment of the present invention, the transmitter 1803 is further configured to: send, to the user equipment, a device identifier allocated to the user equipment after the processor 1802 allocates the first uplink resource to the user equipment, where the device identifier is a unique identifier of the user equipment within a coverage area of the network device; or send, to the control network device, a device identifier allocated to the user equipment after the processor 1802 allocates the first uplink resource to the user equipment, where the device identifier is a unique identifier of the user equipment within a coverage area of the network device.

Optionally, in this embodiment of the present invention, the first uplink resource is a PUSCH resource or a PUCCH resource.

Optionally, in this embodiment of the present invention, the receiver 1801 is further configured to: after the processor 1802 allocates the first uplink resource to the user equipment, if the first uplink resource is the PUCCH resource, receive, by using the first uplink resource, scheduling request information sent by the user equipment; or after the processor 1802 allocates the first uplink resource to the user equipment, if the first uplink resource is the PUSCH resource, receive, by using the first uplink resource, a buffer status report or a data packet sent by the user equipment.

Figure 19:
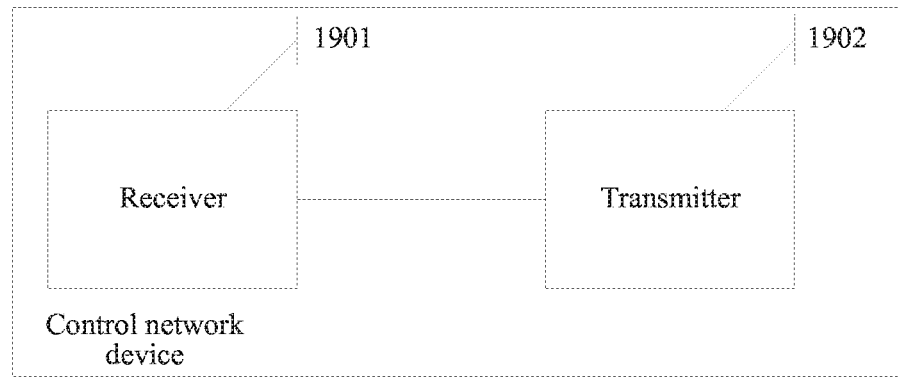
FIG. 19 is a second schematic structural diagram of a control network device according to an embodiment of the present invention.

Referring to FIG. 19, based on a same inventive concept, an embodiment of the present invention provides a network device. The network device may be the control network device described above. The network device may include a receiver 1901 and a transmitter 1902.

The receiver 1901 receives first information from user equipment, where the first information is used to indicate that the user equipment requests a handover from a source network device to a destination network device.

The transmitter 1902 is configured to: send third information to the destination network device, and request the destination network device to allocate a first uplink resource to the user equipment, where the third information is used to indicate that the user equipment requests a handover to the destination network device.

Optionally, in this embodiment of the present invention, the receiver 1902 is further configured to: after the transmitter 1901 requests the destination network device to allocate a first uplink resource to the user equipment, receive fourth information from the destination network device, where the fourth information is used to notify the network device of the first uplink resource allocated to the user equipment by the destination network device; and the transmitter 1901 is further configured to send second information to the user equipment according to the fourth information, where the second information is used to notify the user equipment of the first uplink resource allocated to the user equipment by the destination network device.

Optionally, in this embodiment of the present invention, the transmitter 1901 is further configured to: notify a symbol location of a synchronization signal to the user equipment after requesting the destination network device to allocate the first uplink resource to the user equipment, where the synchronization signal is a signal that is temporarily added and sent to the user equipment by the destination network device and that is used by the user equipment to complete downlink synchronization with the destination network device.

Optionally, in this embodiment of the present invention, the receiver 1902 is further configured to: after the transmitter 1901 requests the destination network device to allocate the first uplink resource to the user equipment, receive a device identifier from the destination network device, where the device identifier is a unique identifier of the user equipment within a coverage area of the destination network device; and the transmitter 1901 is further configured to send the device identifier to the user equipment.

Figure 20:
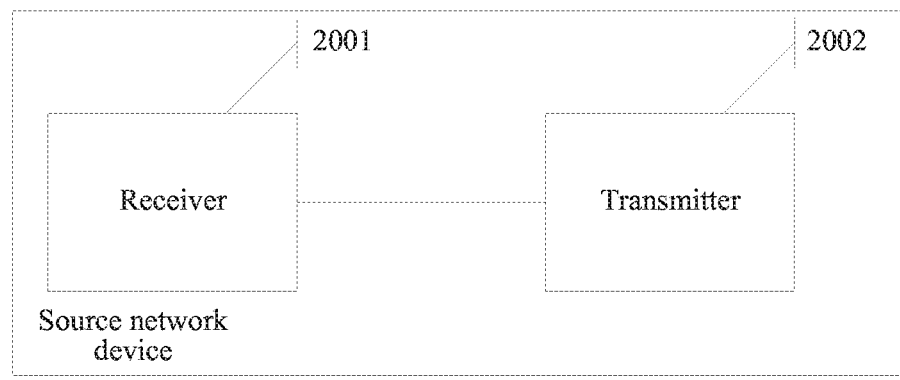
FIG. 20 is a second schematic structural diagram of a source network device according to an embodiment of the present invention.

Referring to FIG. 20, based on a same inventive concept, an embodiment of the present invention provides a network device. The network device may be the source network device described above. The network device may include a receiver 2001 and a transmitter 2002.

The receiver 2001 is configured to receive first information from user equipment, where the first information is used to indicate that the user equipment requests a handover from the network device to a destination network device.

The transmitter 2002 is configured to: send third information to the destination network device, and request the destination network device to allocate a first uplink resource to the user equipment, where the third information is used to indicate that the user equipment requests a handover from the network device to the destination network device.

Optionally, in this embodiment of the present invention, the transmitter 2002 is further configured to: send an uplink TEID and IP address of the network device to the destination network device after the receiver 2001 receives the first information; and send, to the user equipment, a downlink TEID and IP address of the destination network device that are sent by the destination network device according to the uplink TEID and IP address and that are received by the receiver 2001.

In the embodiments of the present invention, when a handover is to be performed, user equipment may send first information that is used to request a handover, then a destination network device may allocate a first uplink resource to the user equipment, and a user may receive second information that is used to notify the user equipment of the first uplink resource allocated to the user equipment by the destination network device. In this way, the user equipment may directly send information to the destination network device by using the first uplink resource. That is, by means of the method in the embodiments of the present invention, during a handover, user equipment does not need to contend for an uplink resource by performing a random access procedure. A destination network device may directly reserve an uplink resource for the user equipment. This reduces steps that need to be performed during the handover of the user equipment, reduces a time required for the handover of the user equipment, and improves handover efficiency of the user equipment.

It may be clearly understood by a person skilled in the art that, for the purpose of convenient and brief description, division of the foregoing function units is taken as an example for illustration. In actual application, the foregoing functions can be allocated to different function units and implemented according to a requirement, that is, an inner structure of an apparatus is divided into different function units to implement all or part of the functions described above. For a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of the present application. The foregoing storage medium includes: any medium that can store program code, such as a USB flash drive, a removable hard disk, a ROM (Read-Only Memory), a RAM (Random Access Memory), a magnetic disk, or an optical disc.

The foregoing embodiments are merely used to describe the technical solutions of the present application. The foregoing embodiments are merely intended to help understand the method and core idea of the present invention, and shall not be construed as a limitation on the present invention. Any variation or replacement readily figured out by a person skilled in the art within the technical scope disclosed in the present invention shall fall within the protection scope of the present invention.

What is claimed is:

1. An apparatus, comprising:
   at least one processor; and
   a non-transitory memory storing instructions executable by the at least one processor, wherein the instructions instruct the at least one processor to perform operations comprising:
   send a measurement report to a control network device;
   receive a handover command from the control network device, wherein the handover command notifies the apparatus of a symbol location of a synchronization signal of a destination network device, wherein the synchronization signal is usable to complete downlink synchronization with the destination network device; and
   receive, according to the received symbol location, the synchronization signal from the destination network device.

2. The apparatus according to claim 1, wherein the handover command further notifies the apparatus of a first uplink resource allocated to the apparatus by the destination network device.

3. The apparatus according to claim 2, wherein the first uplink resource is a discontinuous resource of a physical uplink shared channel (PUSCH).

4. The apparatus according to claim 2, wherein the instructions further instruct the at least one processor to perform operations comprising:
   send an uplink buffer status report or an uplink data packet to the destination network device using the first uplink resource.

5. The apparatus according to claim 1, wherein the instructions further instruct the at least one processor to perform operations comprising:
   receive a device identifier from the control network device, wherein the device identifier is a unique identifier of the apparatus within a coverage area of the destination network device.

6. An apparatus, comprising:
   at least one processor; and
   a non-transitory memory storing instructions executable by the at least one processor, wherein the instructions instruct the at least one processor to perform operations comprising:
   receive a measurement report from user equipment (UE); and
   send a handover command to the UE, wherein the handover command notifies the UE of a symbol location of a synchronization signal of a destination network device, and wherein the synchronization signal is usable to complete downlink synchronization with the destination network device.

7. The apparatus according to claim 6, wherein the handover command further notifies the UE of a first uplink resource allocated to the UE by the destination network device.

8. The apparatus according to claim 7, wherein the first uplink resource is a discontinuous resource of a physical uplink shared channel (PUSCH).

9. The apparatus according to claim 6, wherein the instructions further instruct the at least one processor to perform operations comprising:
   receive a device identifier from the destination network device, wherein the device identifier is a unique identifier of the UE within a coverage area of the destination network device; and
   send the device identifier to the UE.

10. The apparatus according to claim 6, wherein the instructions further instruct the at least one processor to perform operations comprising:
  send a handover request to the destination network device, wherein the handover request indicates that the UE requests to be handed over to the destination network device.

11. The apparatus according to claim 10, wherein the instructions further instruct the at least one processor to perform operations comprising:
  receive a handover response from the destination network device, wherein the handover response notifies the apparatus of the symbol location of the synchronization signal of the destination network device; and
  wherein sending the handover command to the UE comprises:
    sending the handover command to the UE based on the handover response.

12. An apparatus, comprising:
  at least one processor; and
  a non-transitory memory storing instructions executable by the at least one processor, wherein the instructions instruct the at least one processor to perform operations comprising:
    receive a handover request from a control network device, wherein the handover request indicates that user equipment (UE) requests to be handed over to the apparatus; and
    send a handover response to the control network device, wherein the handover response notifies the control network device of a symbol location of a synchronization signal of the apparatus, and wherein the synchronization signal is usable to complete downlink synchronization with the apparatus.

13. The apparatus according to claim 12, wherein the handover response further notifies the control network device of a first uplink resource allocated to the UE by the apparatus.

14. The apparatus according to claim 13, wherein the first uplink resource is a discontinuous resource of a physical uplink shared channel (PUSCH).

15. The apparatus according to claim 13, wherein the instructions further instruct the at least one processor to perform operations comprising:
  receive an uplink buffer status report or an uplink data packet from the UE using the first uplink resource.

16. The apparatus according to claim 12, wherein the instructions further instruct the at least one processor to perform operations comprising:
  allocate a device identifier to the UE, wherein the device identifier is a unique identifier of the UE within a coverage area of the apparatus; and
  send the device identifier to the control network device.

17. A communication system, comprising:
  a control network device; and
  a destination network device;
  wherein the control network device comprises:
    a first non-transitory memory storage comprising first instructions; and
    a first hardware processor in communication with the first non-transitory memory storage, wherein the first hardware processor executes the first instructions to:
      receive a measurement report from user equipment (UE); and
      send a handover request to the destination network device, wherein the handover request indicates that the UE requests to be handed over to the destination network device;
  wherein the destination network device comprises:
    a second non-transitory memory storage comprising second instructions; and
    second hardware processor in communication with the second non-transitory memory storage, wherein the second hardware processor executes the second instructions to:
      send a handover response to the control network device, wherein the handover response notifies the control network device of a symbol location of a synchronization signal of the destination network device, and wherein the synchronization signal is usable to complete downlink synchronization with the destination network device; and
  wherein the first hardware processor further executes the first instructions to:
    receive the handover response from the destination network device; and
    send a handover command to the UE based on the handover response, wherein the handover command notifies the UE of the symbol location of the synchronization signal of the destination network device.

18. The communication system according to claim 17, wherein the handover command further notifies the UE, or the handover response further notifies the control network device, of a first uplink resource allocated to the UE by the destination network device.

19. The communication system according to claim 18, wherein the first uplink resource is a discontinuous resource of a physical uplink shared channel (PUSCH).

20. The communication system according to claim 18, wherein the second hardware processor further executes the second instructions to receive an uplink buffer status report or an uplink data packet from the UE using the first uplink resource.

21. The communication system according to claim 18, further comprising the UE, wherein the UE comprises:
  a third non-transitory memory storage comprising third instructions; and
  a third hardware processor in communication with the third non-transitory memory storage, wherein the third hardware processor executes the third instructions to:
    send the measurement report to the control network device; and
    receive the handover command from the control network device.

22. The communication system according to claim 21, wherein:
  the third hardware processor further executes the third instructions to send an uplink buffer status report or an uplink data packet to the destination network device using the first uplink resource.

23. The communication system according to claim 17, wherein:
  the second hardware processor further executes the second instructions to:
    allocate a device identifier to the UE, wherein the device identifier is a unique identifier of the UE within a coverage area of the destination network device; and
    send the device identifier to the control network device; and
  the first hardware processor further executes the first instructions to:

receive the device identifier from the destination network device; and
send the device identifier to the UE.

\* \* \* \* \*